United States Patent [19]

Anderson et al.

[11] 4,395,864
[45] Aug. 2, 1983

[54] APPARATUS FOR THE AUTOMATIC COUNTING AND BAGGING OF CAN ENDS

[75] Inventors: Gerald R. Anderson, York, Pa.; David L. Mayne, Waterloo; Joseph L. Spychalski, Geneva, both of N.Y.

[73] Assignee: American Can Company, Greenwich, Conn.

[21] Appl. No.: 229,161

[22] Filed: Jan. 28, 1981

[51] Int. Cl.³ .................... B65B 35/50; B65B 43/30
[52] U.S. Cl. ........................... 53/532; 53/254; 53/258; 53/573
[58] Field of Search ............... 53/571, 572, 573, 566, 53/386, 258, 247, 254, 532, 540, 501, 495

[56] References Cited

U.S. PATENT DOCUMENTS

| | | | |
|---|---|---|---|
| 1,085,673 | 2/1914 | Doldt | 53/254 |
| 2,556,214 | 6/1951 | Pottle . | |
| 3,022,620 | 2/1962 | Gallet | 53/386 X |
| 3,062,388 | 11/1962 | Hunter . | |
| 3,106,302 | 10/1963 | Mandonas . | |
| 3,479,795 | 11/1969 | Martin | 53/540 |
| 3,732,665 | 5/1973 | Pitts | 53/258 X |
| 3,854,270 | 12/1974 | Cloud et al. | 53/253 X |
| 3,921,788 | 11/1975 | Roberson et al. . | |
| 3,962,845 | 6/1976 | Mojden et al. | 53/254 X |
| 4,248,032 | 2/1981 | Woods et al. | 53/258 X |

Primary Examiner—Horace M. Culver
Attorney, Agent, or Firm—Paul R. Audet; Aaron Passman; William C. Hosford

[57] ABSTRACT

An automatic system for accumulating, counting, stacking and bagging can ends. The system is designed to protect the end against damage by minimizing the handling of the end. An automatic dispenser counts and dispenses can ends to one of a pair of end stacks which are mounted for rotation about a vertical axis. The end stacks are indexed from a loading position to an unloading position where the filled stack is pivoted from a normally vertical attitude to a horizontal discharging attitude. Ends are discharged to an automatic bagging system for packaging and storage.

3 Claims, 24 Drawing Figures

INDEX №5

INDEX №6

INDEX №1

INDEX №2

INDEX №3

INDEX №4

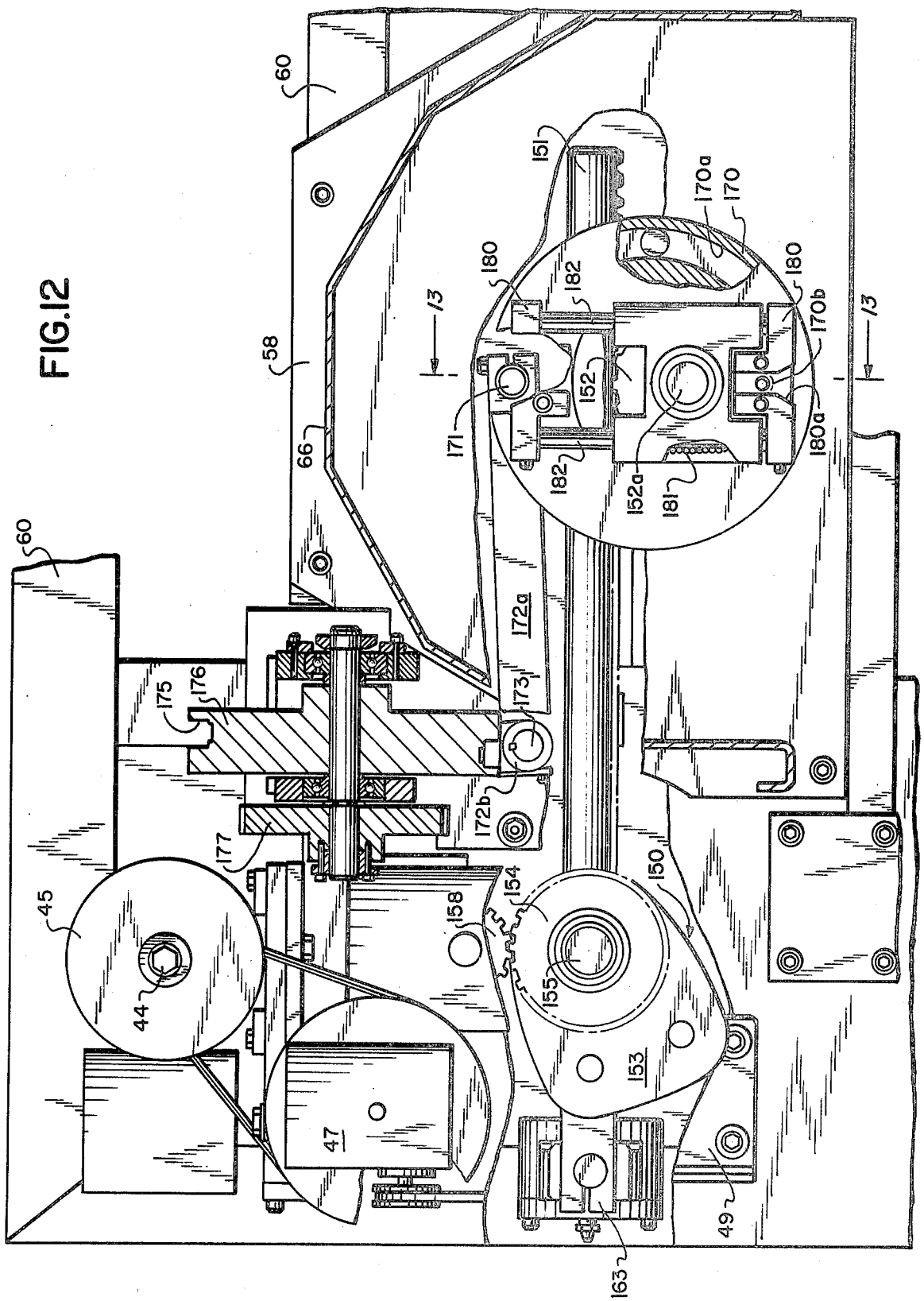

APPARATUS FOR THE AUTOMATIC COUNTING AND BAGGING OF CAN ENDS

BACKGROUND OF THE INVENTION

This invention relates to an apparatus for counting and bagging can ends. More particularly, the invention relates to an apparatus which counts, stacks and bags can ends rapidly and with minimum detrimental effect upon the ends.

The modern can end is a high production item, with billions produced annually. A single brewery may use several hundred million ends each year for the packaging of its products. The can end is a product which is disposable. Despite its short life and high production, however, it is manufactured with a high level of precision, with critical dimensions held to close tolerances. A defective end cannot only result in the contamination and/or loss of the packaged product but, in the case of a product like beer, can even result in damage to other packages in the shipment.

Thus in the can end, we have a high production item which must be handled rapidly and inexpensively, but at the same time it must be handled in a manner which safeguards its integrity.

Can manufacturers ship can ends as well as can bodies to brewers, food processors and other canners who assemble the can body and can end at the time of filling. Can manufacturers also ship can ends to their own plants where three-piece cans are fabricated. In this case, the manufacturer seams the first end to the body and canner the second.

Each package of ends must be identified, sampled and tested to ensure that the ends are within specification. Moreover, the sampling should be done automatically, so as to relate a particular package of ends to specific apparatus thereby enabling equipment to be promptly identified for adjustment when quality deviations are noted.

In the past, can manufacturers have relied on the use of manual labor for packaging can ends. A stack of ends was defined in terms of an average or mean count so that on the average the customer received the correct number of ends in a package. The packages or bags were manually filled with the aid of a guide or horn.

Automatic systems are available for counting and bagging can ends, but they lack the speed and compactness which is desired. Further, the present automatic systems result in considerable handling of the can ends with possible damage thereto.

It is therefore an object of this invention to provide an improved apparatus for the rapid automatic counting and bagging of can ends which avoids damage and loss of integrity to the can end.

It is further an object of this invention to provide an apparatus for the rapid automatic counting and bagging of can ends in which the handling of the ends is minimized.

It is an additional object of this invention to provide an apparatus for counting and bagging can ends, which has a compact structure and at the same time affords a high level of reliability and control.

Finally, it is an object of this invention to provide an apparatus for counting and bagging can ends which is economical to manufacture, operate and maintain.

SUMMARY OF THE INVENTION

It has now been found that certain of the foregoing and related objects of the invention are readily attained in apparatus comprising a frame on which is mounted a dispensing means, a pivot means with an associated stack and a bagging means. The dispensing means is designed to receive, orient and dispense disc-like workpieces. The stack, operably connected to the pivot means is mounted beneath the dispensing means to receive, accumulate and axially array the dispensed workpieces. The pivot means enables the stack to pivot from a vertical attitude for loading to a horizontal attitude for unloading. A bagging means is provided to receive and support a bag in alignment with the horizontally disposed stack for the receipt of the array of workpieces. The apparatus advantageously further includes a counting means so that a fixed count of workpieces can be dispensed to the stack for bagging. The apparatus may additionally include a turret mounted on the frame for rotation about a vertical axis. The pivot means may be mounted on the turret, in this way the stack may be loaded in a first position where it is vertically aligned with the dispensing means, rotationally indexed to a second position, and pivoted from a vertical attitude to a horizontal attitude for unloading. The apparatus may advantageously incorporate a plurality of stacks each of which are pivotably mounted on the turret. For example, a pair of stacks may be mounted on opposite sides of the turret in vertical spaced apart relationship. When the first stack is in a first position beneath the dispensing means and aligned therewith for receipt of can ends, the second stack is in the second or unloading position. In the second position, the stacks may be pivoted from a vertical attitude to a horizontal attutide whereupon the stack may be unloaded. After unloading, the stack in the second position may be pivoted from a horizontal attitude to a vertical attitude so that the turret may be indexed, thereby aligning the empty stack with the dispensing means and advancing the loaded stack into the second position for unloading.

Each of the stacks is provided with a structural mast on which is disposed a bearing plate for pivotal mounting on the turret. A series of guide blocks are positioned along the mast in longitudinal alignment. At least one slide rail is received within the guide blocks to support the ends when they are conveyed horizontally along the rail for unloading. Guide rods cooperate with the rail to define a channel in which the ends are arrayed. An elevator, advanced or retracted along the channel by a drive means, supports the arrayed ends when the stack is in the vertical attitude and expels the ends from the stack when the stack is disposed horizontally for unloading. A D.C. drive motor of the drive means permits the speed of the drive to be controlled so that the elevator movement may be synchronized with the feed rate of the dispensing means.

The apparatus for counting and dispensing disc-like workpieces comprises; a support means, guide means, a plurality of feed means, stop means, timing means, drive means and control means. The guide means is vertically mounted on the support means and serves to receive, align and direct the axial advance of the workpieces. A plurality of rotatable feed means, provided with spiral lands, are disposed about the guide means to intrude into the tubular channel of the guide means and engage and individually advance the workpieces. The stop means, include knife blades which can be introduced into the channel to intercept the workpieces. One stop means is disposed above each of the feed means. A timing means, which is mounted on the support means is employed to count the workpieces dispensed by the feed means.

More specifically, the can end counting and dispensing apparatus comprises; a support means, a vertical feed tube, three equispaced feed means, a stop means disposed above and aligned with each of the feed means, drive means, timing means and control means. The feed tube has three equispaced transverse openings formed in the wall thereof. The feed means, which are disposed in a common plane perpendicular to the feed tube, are provided with spiral lands rotatable about a vertical axis. The feed means intrude into the tube through the three wall openings to engage and individually advance the ends. The stop means include a rotatable blade the length of which is sufficient to enter the tube and intercept the can ends. The lands of the feed means are advanced in synchronized rotation by a drive means. The control means advances or retracts the blades of the stop means to either restrain or permit the advance of ends into engagement with the feed means.

Preferably the stop means comprises a shaft, a drive pulley mounted on the shaft and a disc. The disc includes 3 blade portions defined by 3 scallops. While the blade portion of the disc is of sufficient diameter to intrude into the feed tube, the scallop portion is not. Thereby the axial advancement of the can ends may be restrained when the blade portion of the three discs is caused to intrude into the tube.

Preferably the end counting and dispensing apparatus additionally includes a control means which includes a gear belt which is designed to engage the drive pulleys of the stop means, a belt clamp mounted on the gear belt and operably connected to a solenoid. The solenoid, which is responsive to a signal from the timing means advances or retracts the gear belt thereby rotating the drive pulleys and indexing the stop means.

Additionally, it is desirable to provide the feed tube with high level and low level sensors to start and stop the rotation of the feed means.

The apparatus for bagging can ends comprises a frame, a magazine for holding flattened bags, a bagging table, inclinable means and lifting means. The magazine includes upright guides and ledges to support the flattened bags. The bagging table which is mounted on the frame for vertical reciprocation includes a pair of hinged leaves. The leaves in turn are provided with vacuum ports. An inclining means engages the leaves and inclines or folds the leaves one toward the other. A lifting means effects the periodic elevation and lowering of the bagging table thereby enabling the table to rise, vacuum strip a bag from the magazine and lower the bag to a bagging plane. At the bagging plane, the table leaves are inclined from a normally open attitude with an included angle of 180° to an inclined attitude with an included angle of less than 180°. The included angle of the inclined leaves is preferably between 120° and 140° say 130°.

It is preferable that the bagging apparatus additionally include a bag pick-up which includes a vacuum head mounted on the frame for periodic reciprocation to engage the bag in cooperation with the vacuum ported table leaves. After the table leaves engage the underside of the bag, the vacuum head of the bag pick-up engages the upperside of the bag proximate the bag mouth and rises to complete the opening of the bag.

Finally, it is advantageous to include a bagging horn in the bagging apparatus. The horn is designed for periodic horizontal reciprocation, so that it may be advanced into or out of the opened bag in cooperation with the table and pick-up to ensure a fully distended bag mouth for the ready acceptance of can ends.

Thus a method for counting and bagging can ends is provided which comprises the steps of axially advancing the ends vertically through a gate formed by a plurality of rotating knives. The ends are counted as they advance through the gate. The advance of ends continue until the count matches a predetermined figure whereupon the gate is closed by rotating the knives until they intrude into the path of the ends. Ends passing through the gate are allowed to free fall along a channel to form a vertical array. The array of ends may be moved from the loading station to a remote position by rotating the stack about a vertical axis where the stack may be pivoted from a vertical attitude to a horizontal attitude for unloading. The arrayed ends may then be inserted into a bag.

BRIEF DESCRIPTION OF THE DRAWINGS

FIG. 12 is a plan view taken in partial section along the line 12—12 of FIG. 2, and showing the interrelationship between the transmission and the turret driven thereby. A turret locking mechanism is also detailed.

DETAILED DESCRIPTION OF THE ILLUSTRATED EMBODIMENT

Figure 1:
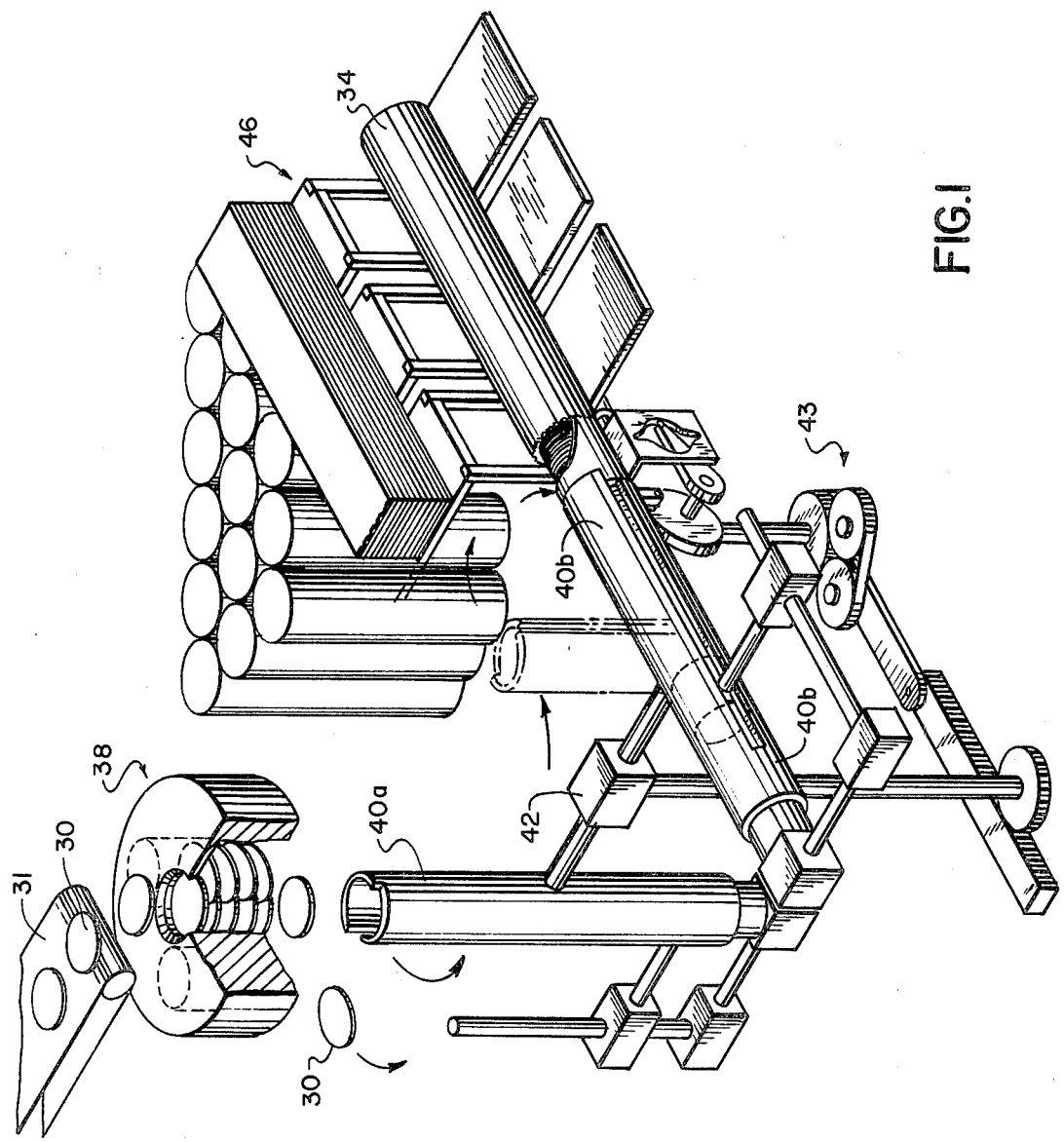
FIG. 1 is a perspective view of an illustrative embodiment of the instant invention.

Herein shown in FIG. 1 is an illustration representation of a compact apparatus for counting and bagging can ends. Ends 30 are received from a conveyor 31. Typically, but not necessarily, the ends are delivered to the apparatus in a longitudinal fashion. Dispenser 38 receives, orients, counts, and dispenses the ends axially. A pair of stacks or cages designated as 40A and 40B are mounted on a turret 42 in vertical parallel spaced apart relation. The forward stack may be pivoted from its normal vertical attitude (shown in FIG. 1 in phantom) to a horizontal attitude for unloading. The rear stack is in the first or loading position where it is vertically aligned with the dispensing unit 38 to receive and accumulate a count of can ends. Thus while stack 40A is loaded, stack 40B is unloaded. After the discharge of can ends, stack 40B will be returned to a vertical attitude and the turret 42 will then index 180°, rotating stack 40A from the first or loading position at the rear of the apparatus to the second or unloading position at the front. Stack 40B will simultaneously move to the loading station for a fresh count of ends. Turret movement for indexing and for pivoting the forward stack is provided by a novel indexing drive unit 43. An elevator means may be advanced or retracted to support or discharge the can ends. Can ends discharged from the stack are funneled into an open bag 34.

Figure 2:
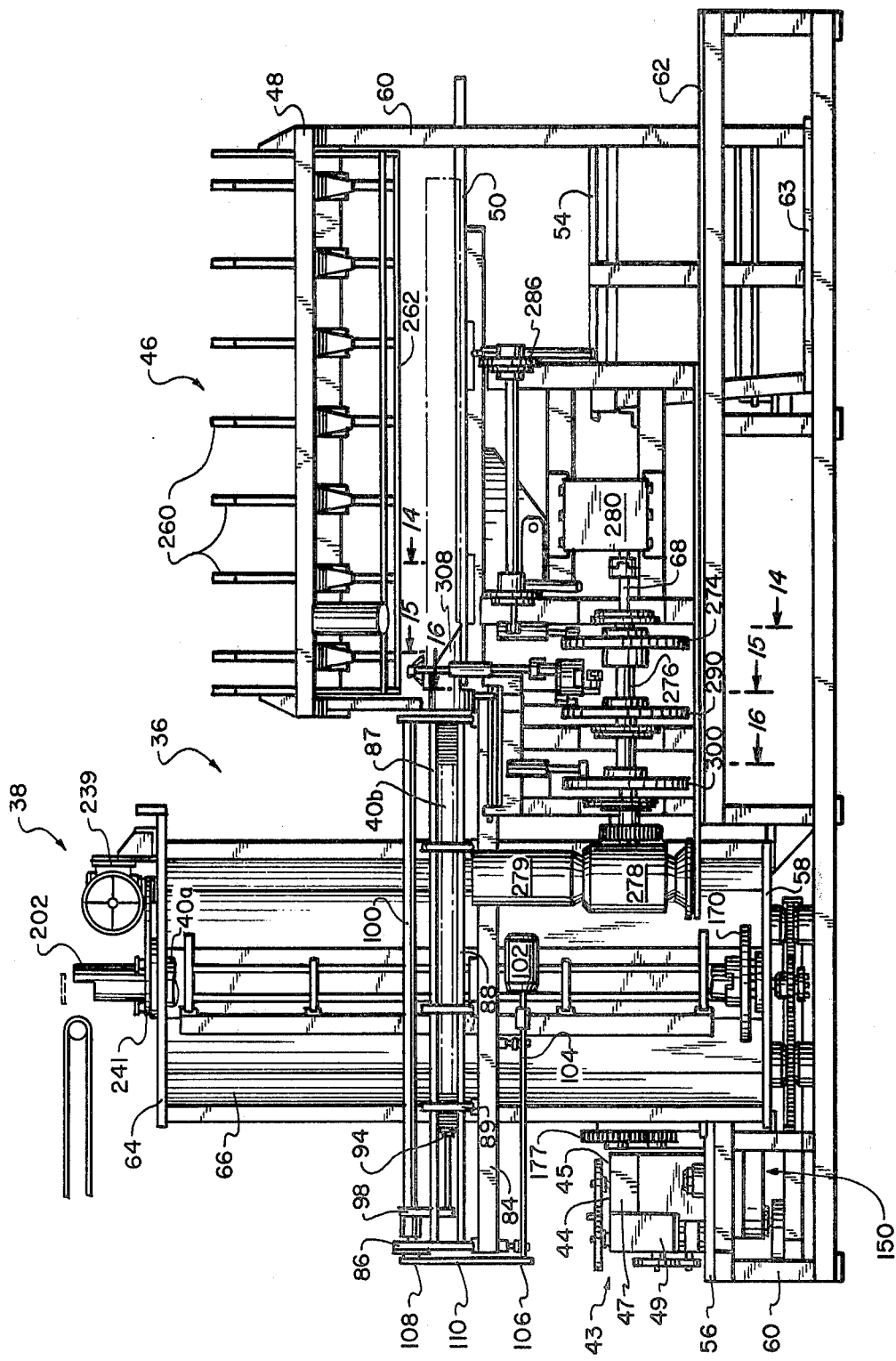
FIG. 2 is a front elevation of the preferred embodiment of the instant invention. The turret assembly and filled bag handling features have been removed for clarity.
Figure 3:
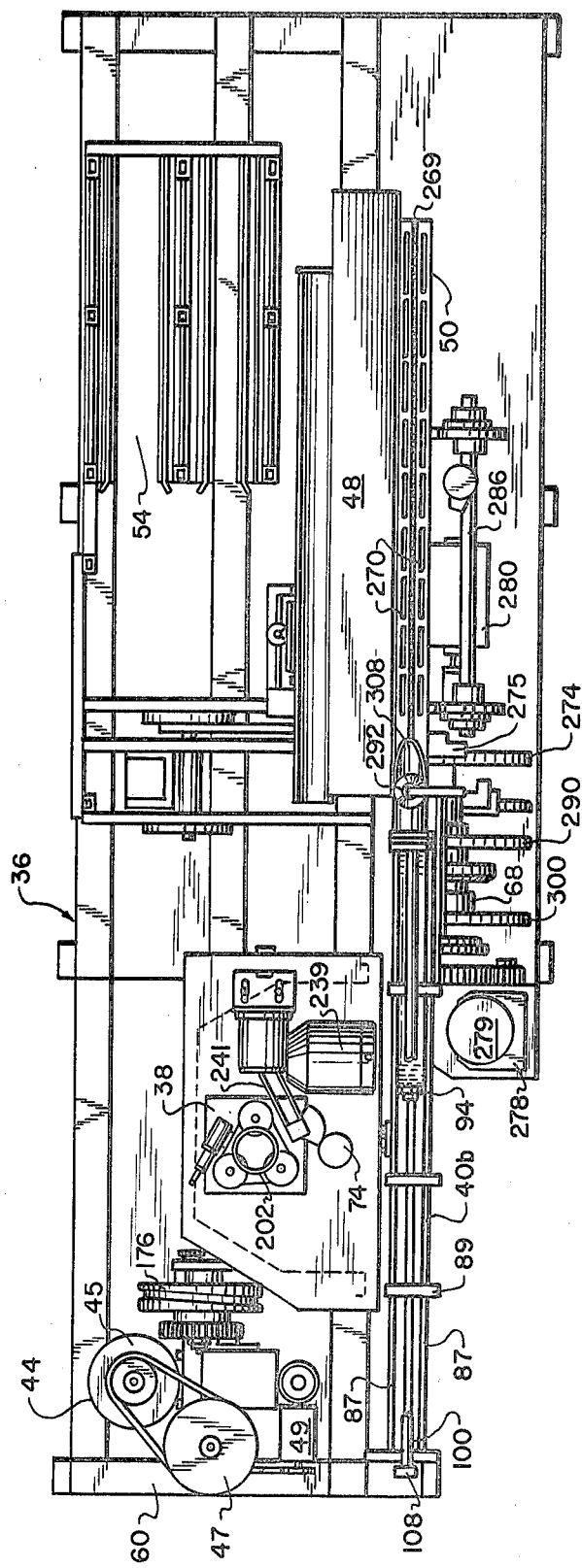
FIG. 3 is a plan view of the preferred embodiment of the instant invention. The turret assembly and filled bag handling features have been removed for clarity.

FIG. 2 is a front elevation of the preferred embodiment of this invention. FIG. 3 is the corresponding plan view. In these figures, the turret assembly has been removed from the base plate 170 for clarity. The apparatus is supported on a tubular frame 60. An upper deck 56 on the frame supports indexing drive system 43. A ¾ Hsp motor 44 coupled to a Horton electro-pneumatic clutch brake 45, drives a gear reducer—index unit 47. The output shaft of gear reducer—index unit revolves 120° to drive a novel indexing transmission 150. The electro-pneumatic clutch brake is controlled by a cam switch 49. A rotary base plate 170, which is operably joined to the transmission is mounted on lower deck 58. The turret assembly, not shown in FIG. 2, mounts on base plate 170 and delivers the rotary and pivotal movement to the stacks 40A and 40B, which are respectively shown in vertical and horizontal attitudes. Each of the stacks employ a series of rods to guide and support the arrayed can ends. The stacks will be described in greater detail.

The dispensing unit 38 is mounted on an elevated support plate 64 carried by a vertical shroud 66 which partially encloses the stack in its first or loading position.

The bagger unit 46 is mounted on the right hand side of the frame and is carried by an upper platform 62 and a lower platform 63. The upper platform 62 supports the empty bag magazine 48, the bagging table 50 and the bagger drive 68. The lower platform 63 supports the storage bin 54 for filled bags.

Figure 4:
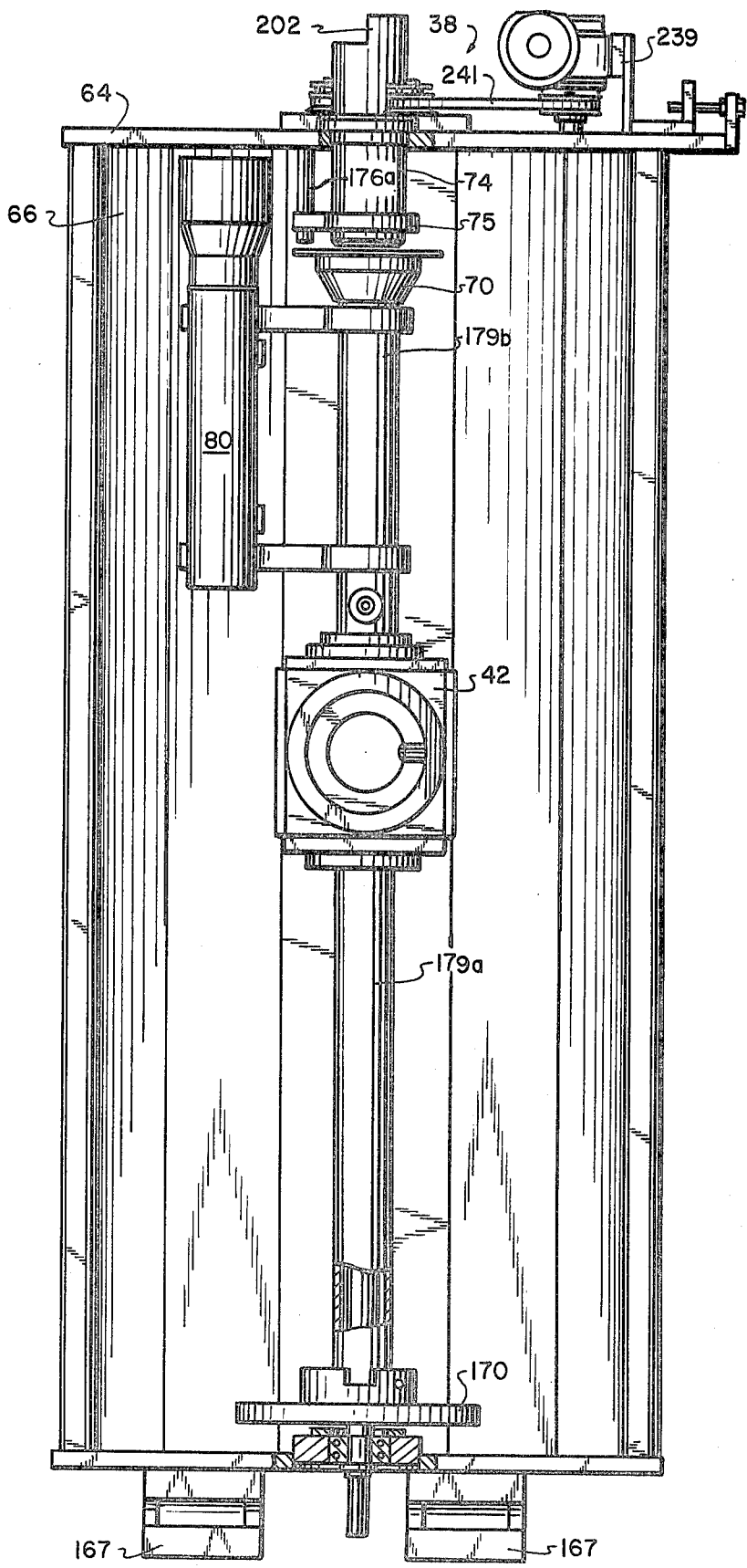
FIG. 4 is a front elevation of the turret assembly including the shroud and dispenser unit, but removed from the apparatus proper.

The turret assembly is shown in FIG. 4 with shroud 66 and dispenser unit 38 but removed from the frame work 60. In FIG. 4 the stacks have been omitted The turret 42 houses differential gearing, which will be described with a discussion of the structure and operation of the transmission. The turret is mounted between lower and upper turret tubes 179a and 179b. The lower tube is supported by base plate 170 while the upper turret tube terminates in an upper drive housing 70 which is provided with a roller bearing 72 to rotatably engage a pilot 74 which is affixed to support plate 64. A stack detector bracket 75 is clamped to the pilot 74. A pair of sensors 76A and 76B are mounted on bracket 75 (only 76A is shown). A stack detector plate affixed to the upper drive housing, rotates with the housing, and cooperates with the sensors to identify the presence of stack A or stack B in the loading position. A sample tube 80 is mounted on upper turret tube 179b.

The sample tube is cylindrical in cross section with a diameter sufficient to receive end samples axially arrayed. The head of the sample tube is enlarged, elongated and opened at the top to accept a sample end ejected by the dispenser as the tube is swept past during the indexing. An access door (not shown) in the wall of the tube facilitates sample removal for inspection.

Figure 5:
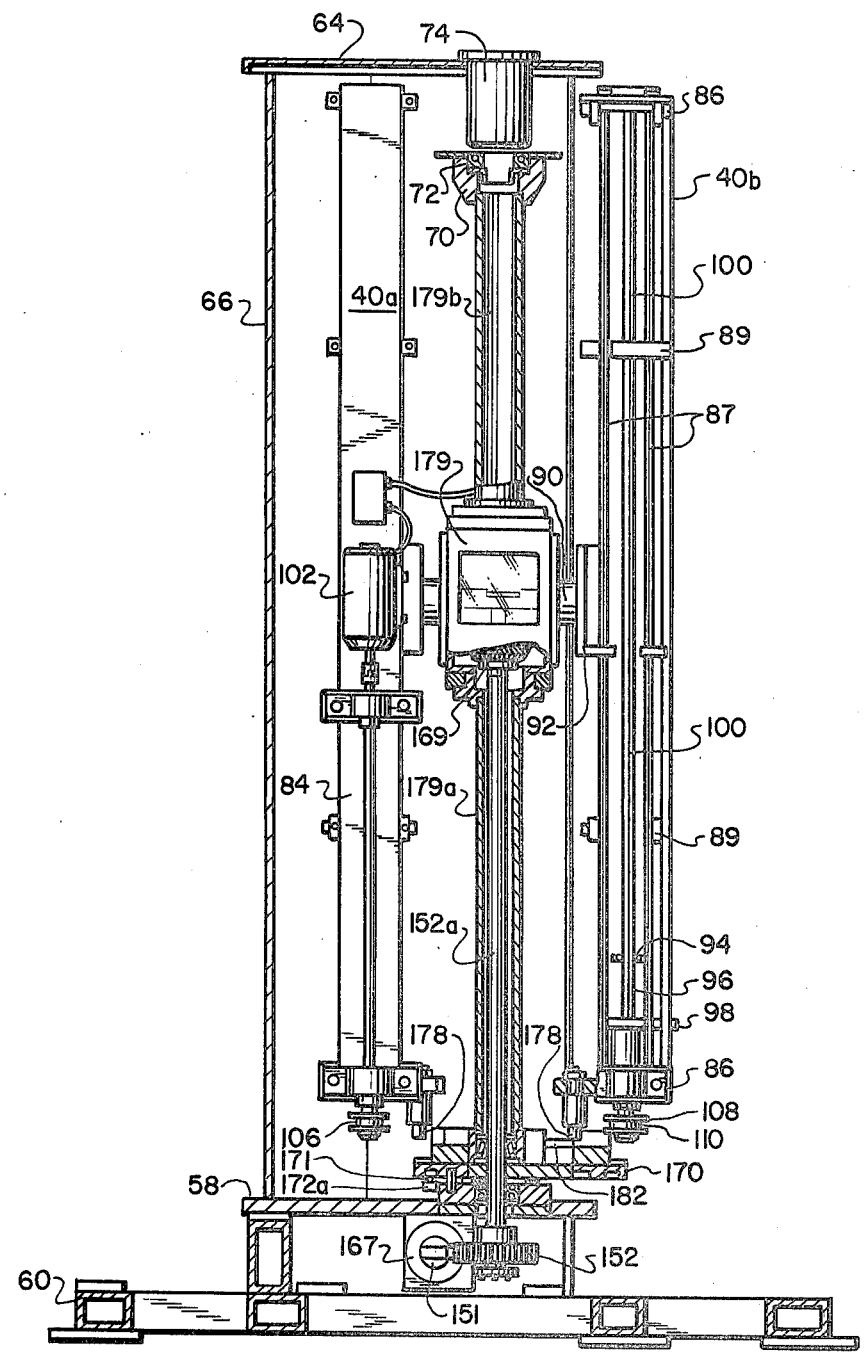
FIG. 5 is a vertical sectional view of the turret assembly taken along the line 5—5 of FIG. 3 and showing the twin stacks in vertical attitude.
Figure 6:
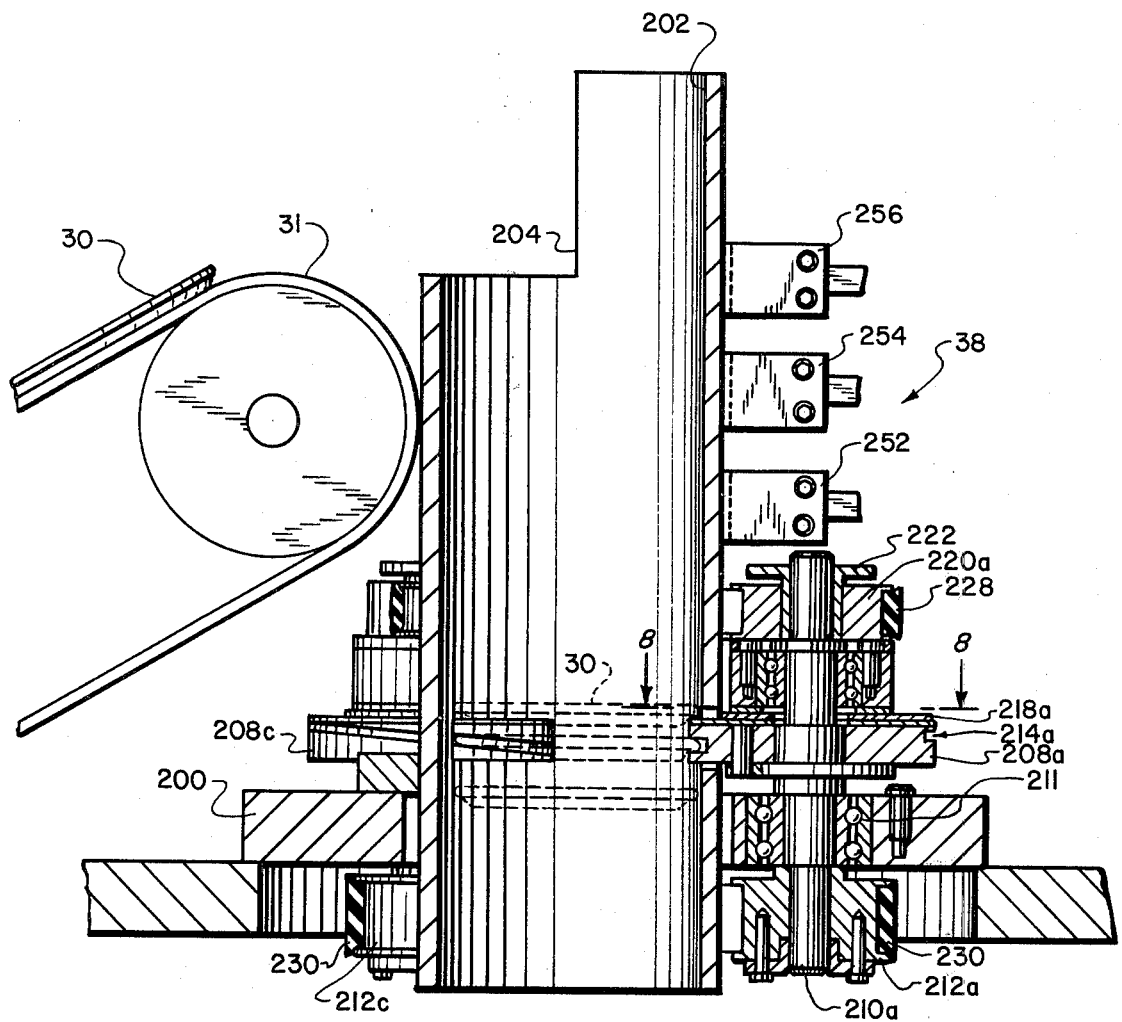
FIG. 6 is a vertical sectional view of the dispenser taken along the line 6—6 of FIG. 7.

The end stacks best shown in FIGS. 2 and 5, include a tubular mast 84 as a support structure, upper and lower bearing brackets 86, guide blocks 89, a pair of guide rods 87, and a pair of stack rails 88. The guide rods and stack rails are supported by the bearing brackets and the guide blocks. The two guide rods and the two stack rails cooperate to form an elongated stacking channel or cage in which the can ends may be received in axial array. When the stack is in the vertical attitude, as for example in the loading operation, the two rails function as guides. In the horizontal attitude, however, the rails serve as bearing surfaces since the rims of the can ends ride on these rails during discharge. The stack is pivotably mounted on turret 42 by means of a pivot plate 90 which is joined to the stack by means of a pivot mounting bracket 92. An elevator pedestal 94 may be raised or lowered in the stacking channel by a drive means. The drive means employs a variable speed D.C. drive motor 102. The motor which is mounted on the mast is coupled to a drive shaft 104 on which is mounted an elevator drive pulley 106. The drive pulley engages a lead screw pulley 108 through a gear belt 110. Rotation of lead screw 100 causes the elevator mounting block 98 and the elevator pedestal 94 to advance or retreat along the stacking channel.

A novel indexing drive system is employed to properly position the stacks at precisely the moment required. The timing of the drive which rotates the turret or swings the stack at the prescribed moment is handled by a mechanical drive system which controls the interrelationship of the stacks as already discussed.

Figure 10:
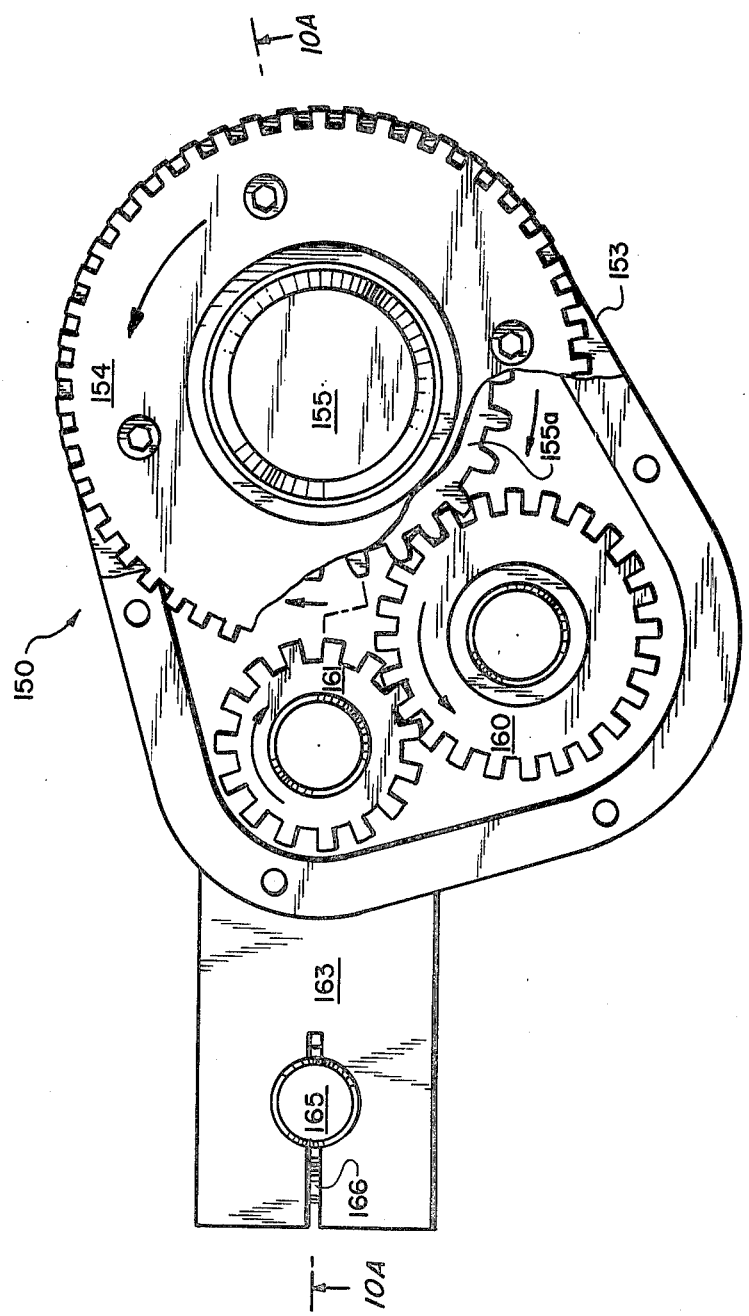
FIG. 10 is a plan view of the indexing transmission with a portion of the housing removed to show the gearing.
Figure 10A:
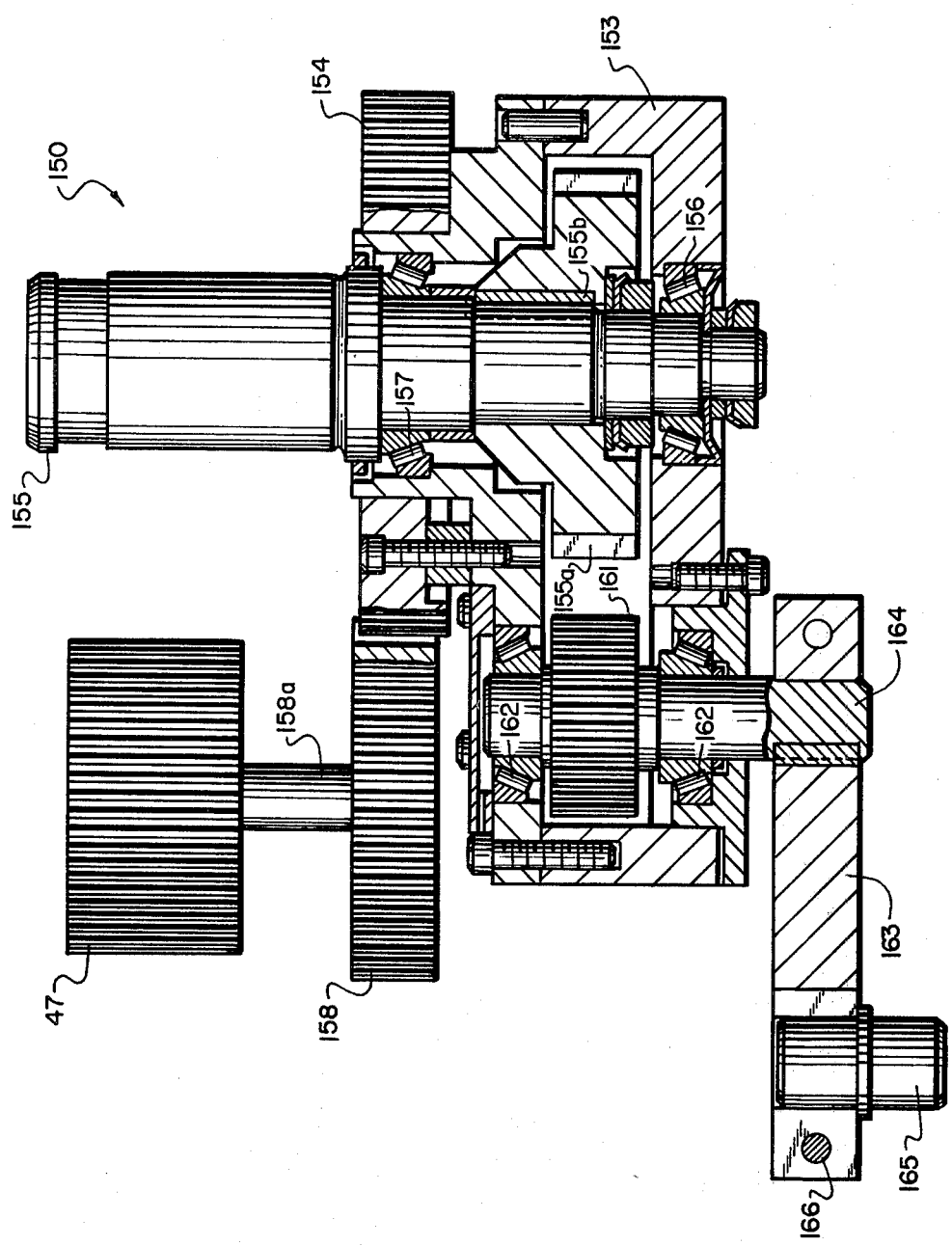
FIG. 10A is an enlarged partial cross-sectional front view of the basic transmission taken along the line 10A—10A of FIG. 10. The transmission is employed for converting rotary motion into linear reciprocating harmonic motion.
Figure 11A:
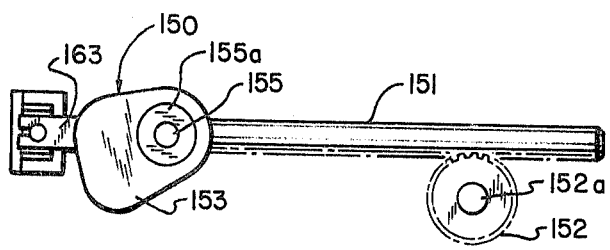
FIG. 11 is a schematic bottom view of the transmission shown in various operative positions to illustrate the means by which rotary motion is converted into reciprocal harmonic motion.
Figure 11B:
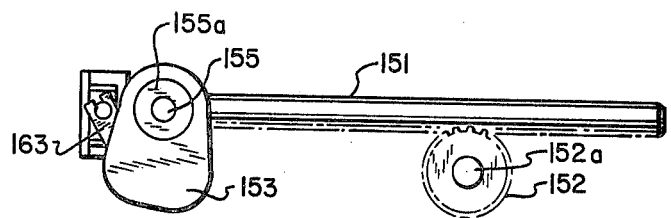
Figure 11C:
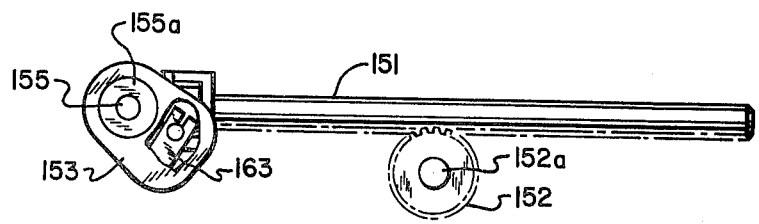
Figure 11D:
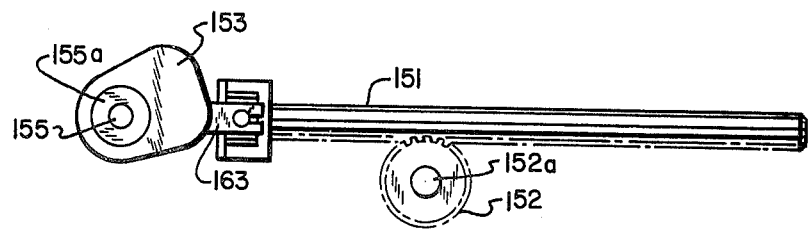
Figure 11E:
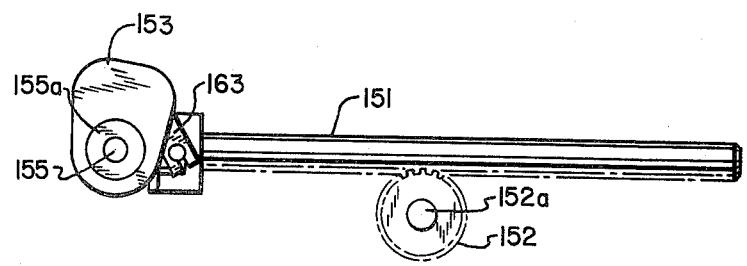
Figure 11F:
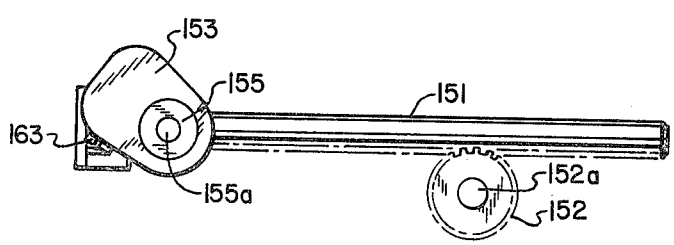

Turning now to FIGS. 10, 10A and 11 A–F, an indexing transmission 150 is shown which converts a 120° rotary motion of output pinion 158 of gear reducer-index unit 47 into straight line harmonic motion with an intermittent reciprocating stroke which totals 15.708" in length. The stroke is arranged to be intermittent in that the periodicity is divided into three segments. Each segment is driven by a complete modified sine function to ensure that each indexing operation begins with an acceleration of 0 and ends with an acceleration of 0, thereby avoiding a jolting start and stop movement. It should be noted that the 15.708" is the pitch line circumference of pinion 152 which drives the turret and differential 169. In FIG. 11 A–F, the first segment or index, number one of the stroke is shown to be one-half of the total distance. Thus, the stroke transmitted via a rack 151 drives a pinion 152 through 180° of clockwise rotation. The next segment or second index, as shown in FIG. 11 A–F, will have a stroke of 3.927" which represents one-quarter of the total stroke. This index is used to drive the pinion 152 and swings the front stack 90° from a vertical position to a horizontal position for unloading. The third index or segment of the stroke is also one-quarter of the total stroke or 3.927" and it is used to return the front stack to a vertical position. The fourth index or segment of the stroke is 7.854" and it is applied to rotate the stacks from the loading position in the rear to the unload position in the front or 180° counterclockwise. After this is accomplished the fifth segment of the stroke being the fifth index requires another one-quarter stroke or 3.927" and it swings the front stack to the horizontal unloading position. And finally, the sixth segment or index swings the unloaded front stack back to the vertical position from which it is in position to be rotated relative to the rear stack 180° clockwise during index one or the first segment of the stroke.

The stroking is provided by the transmission 150 best seen in FIGS. 10, 10A in the following manner. The transmission 150 is composed of a gear housing 153 to which is mounted a gear 154. The gear housing 153 is permitted to rotate about a gear housing mounting shaft 155 which is vertically disposed and rotatably attached to the gear housing at its lower end through a taper roller bearing 156 and at the upper end by a taper roller bearing 157. The shaft 155 does not rotate. A pinion 158 for driving the gear 154 is meshed therewith and it is supported and driven through shaft 158a connected to gear reducer-index unit 47 whereby rotary motion applied to pinion 158 rotates fixed gear 154 and its gear housing box 153 about shaft 155. The gear ratio between pinion 158 and gear 154 is 2:1. For each index, pinion 158 is rotated 120°.

Carried inside box 153 are three gears meshed with one another and in a common plane. Shown in FIGS. 10, 10A is the first gear 155a; it is attached to shaft 155 by a key 155b positioned between shaft 155 and gear 155a. Consequently, gear housing 153 rotates as it is driven by gear 154, with first gear 155a remaining stationary. An idler or intermediate gear 160 rolls about stationary gear 155a as gear 160 is carried on a fixed shaft and supported by needle bearings (not shown) with the transmission 150 gear housing 153 as same is rotating about shaft 155. Thus, rolling motion is imparted as a rotational input for an output or second gear and shaft 161 shown in FIGS. 10 and 10A. Gear and shaft 161 are carried by a pair of taper roller bearings 162 supported by the gear housing 153 whereby output gear and shaft 161 is vertically disposed with its axis parallel to that of shaft 155 for locating gears 155a and 160 in a common plane. As driven by pinion 158, the gear box rotates about the axis of the fixed shaft 155 carrying in crank-like fashion output gear and shaft 161 in a circular orbit. It should be noted that the ratio of teeth in gear 154 to those in gear 161 is 2:1.

Keyed to the bottom of the output gear 161 is a connecting arm 163 via a key 164 held within key way 161a in the bottom of the gear and shaft 161. Connecting arm 163 carries in parallel spaced relation to shaft 161 a drive lug 165 which is circular in cross-section and is held to the end of connecting arm 163 by a pinch bolt 166 which draws together the slotted end of connecting arm 163 about the lug 165. The drive lug 165 moves back and forth in a linear path.

FIG. 11 A–F schematically illustrates the various positions of gear housing 153 and the respective positions of connecting arm 163 during portions of the intermittent stroke. More particularly, the drive lug 165 is associated with rack 151 to drive same in accordance with the described harmonic motion. Rack 151 is supported in ball bushings 167 (see FIG. 5) which control its linear motion whereby the pinion 152 is rotated in accordance with the intermittent reciprocal motion of rack 151. Bushings 167 are carried on the overall chassis of the machine.

Figure 13:
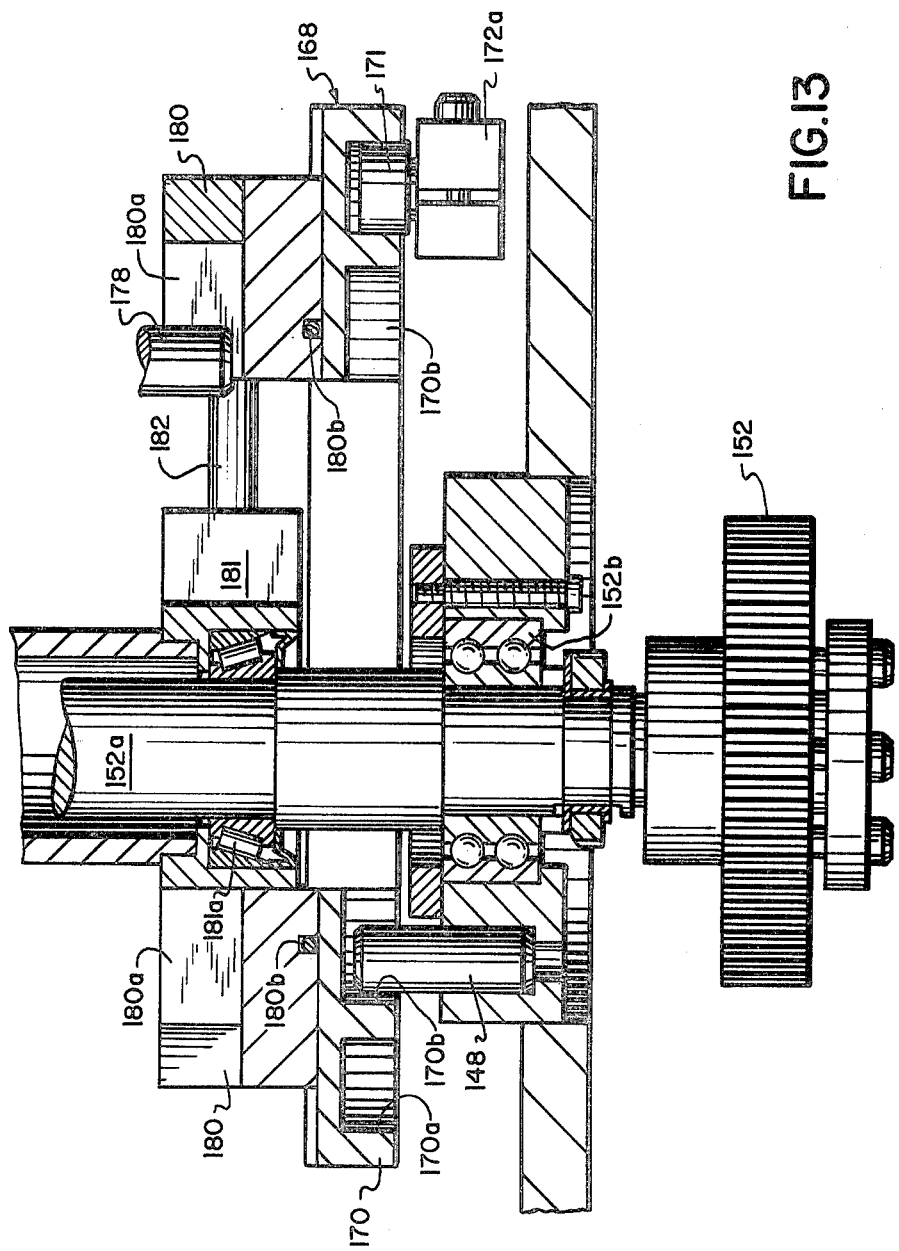
FIG. 13 is an enlarged sectional view of the turret base plate and locking mechanism taken along the lines 13—13 of FIG. 5.

FIG. 12, a plan view, shows connecting arm 163 in one of the positions which it assumes in driving rack 151 and its associated pinion 152. Pinion 152 is connected to a drive shaft 152a which is the input that rotates the stacks in turret fashion as already described. A ball bearing 152b carried on the chassis supports the drive shaft 152a, (see FIG. 13). More particularly, FIG. 13 is a cross-section of a partial fragmentary view of the mechanism 168 which locks the stacks for controlled rotation. The same mechanism 168 is shown in plan view in FIG. 12, both views are necessary for an understanding of the mechanism 168 operation. This mechanism 168 rotates with shaft 152a, see FIG. 5. The end elevational view of FIG. 5 is helpful in understanding the relation between the mechanism 168, the stacks and the rack 151 and pinion 152. In FIG. 5, the drive shaft 152a is vertically arranged to drive a differential 169. Differential 169 is located such that input shaft 152a is the axis of rotation of the differential housing or turret 179 and its output shafts are the axis for the pivoting of the stacks 40A and 40B. Therefore there are three rotatable members attached to the differential. To function properly two of the three members must be locked in position during each index. Thus input shaft 152a can be split. Differential 169 is conventional in that the common input from shaft 152a can be split to swing either one stack or the other stack or can be arranged to swing neither stack from the vertical to the horizontal position whereby if the stacks are locked in the vertical position the stacks rotate about the vertical axis of shaft 152a. That is to say, that if both stacks are locked in a vertical position, by mechanism 168, they will due to the rotation of shaft 152a be caused to rotate 180° either clockwise or counterclockwise in accordance with the motion imparted by rack 151 through means of its interconnection with shaft 152a.

More particularly, as shown in FIG. 13, there is a base plate 170 associated with mechanism 168. Plate 170 is circular in shape and contains a drive groove 170a on its bottom surface or face. As best shown in FIG. 12, the groove 170a is circular and is the track for a follower 171 carried on a bell crank camming arm 172. Bell crank 172 has a long leg 172a and a short leg 172b. Between the legs is the pivot mounting 173 about which bell crank 172 is free to pivot. Short leg 172b contains a cylindrical bushing 174 for following a peripheral cam track 175 located in the rim of a wheel 176. Track 175 has a varying axial displacement with respect to the axis of the wheel 176 whereby cylindrical bushing 174 is caused to track axially relative to wheel 176 as same is rotated about the axis. Wheel 176 is driven by gear 177 which in turn is driven by gear reducer-index unit 47 as shown in FIG. 12, as bushing 174 tracks for and aft axially, bell crank 172 pivots about its mounting 173 and longer leg 172a is caused to reciprocate in an arcuate fashion about pivot 173 thereby causing base plate 170 to reciprocate relative to and perpendicular to the axis of shaft 152a. The relative reciprocal position of base plate 170 is identical in FIGS. 12, 13 and 5 and this is only one position which the base plate 170 assumes. The mounting which carries base plate 170 permits it to reciprocate in a plane perpendicular to the shaft 152a will be discussed in detail. However, it is important to know that the shifting of the base plate 170 functions to act as a lock mechanism 168 for restraining the swinging of the stacks relative to one another.

The base plate 170 contacts and locks with one of the rear stacks by means of a stack locating pin 178 which depends downwardly from the stack and in parallel axially spaced relation to the axis of shaft 152a. There is a similar pin located on the other stack. The position of the base plate 170 can be, as shown in FIGS. 5 and 13, shifted to lock the rear stack in its vertical position using pin 178 and lock the turret using pin 148, or it can be shifted to the left to lock both the front and rear stacks in a vertical position for purposes of holding same during turret rotation of the stacks either clockwise or counterclockwise to place the other stack in the front position for unloading. The shifting of the base plate is accomplished by the input from the wheel 176 and is timed to coincide with index control input from the harmonic motion of rack 151.

As best seen in FIGS. 5 and 13, the differential housing or turret 179 for differential 169 has a depending tube 179a which extends therefrom and rotates therewith; it is connected to base plate 170 by means of spacers 180 which are keyed at 180b to the base plate 170. Spacers 180 are designed to interlock with pins 178 by means of a chamfered groove 180a (FIGS. 12 and 13) when same are moved by the base plate 170 under the control of the cam wheel 176. The connection between the housing 179 for the differential and the spacer 180 for the front desk stack is through an H-shaped bearing support 181 rotatably mounted on tapered roller bearing 181a relative to shaft 152a and supports for transversing perpendicular movement motion thereto, two parallel guide rods 182 carried in a common plane, which pass through ball bushings 181b in support 181. The guide rods 182 carry the spacer 180 to intermittently shift relative to shaft 152a and with respect to the pin 178 for the front stack. That is to say, that when the spacers 180 are centered relative to the support 181, the stacks are locked in their vertical position by the spacers 180 through their pins 178 and are driven via the torque reaction input imparted to the differential housing 179 by means of its torque reaction due to the rotation of shaft 152a and the restraint of the swinging of the stacks. The locking of pins 178 by means of spacers 180 prevents rotation of the differential side outputs 169a thus causing the housing 179 and its associated tube 179a to rotate. In accordance with the input direction of rotation of the pinion 152, the stacks rotate either clockwise or counterclockwise 180° depending upon the stroke direction of the rack 151. When the support 181 is shifted to the rear stack locking pin 178 and turret locking pin 148 (FIGS. 12 and 13), the rear stack is restrained in the vertical position and the front stack is permitted to receive the drive from the front side output 169a of the differential 169 which drive causes it to swing from a vertical position as shown in FIG. 5, to a horizontal or unloading position as previously discussed.

As shown in FIGS. 12 and 13, there is a lock to hold base plate 170 from rotating when the plate 170 is shifted to its rearwardly position. That is to say that, a pair of slots 170b best shown in FIG. 12 are disposed within the bottom of plate 170 and are aligned radially apart and across from one another along a diameter of plate 170. The shifting of plate 170 by means of the cam track 175 in wheel 176 causes the slot 170b to slide over a fixed pin 148, which is vertically disposed and carried on the chassis. Thus, any torque reaction received via the tube 179a will not act to rotate the base plate 170 as same is locked to the chassis by means of either of the slots 170b. The total force or torque reaction from the differential 169 will thus be applied via the front side output 169a which is not locked. Thus, the rear stack will remain in its vertical position and the front stack will swing since the base plate 170 cannot rotate.

The dispenser unit 38, which is mounted on the upper side of support plate 64, feeds can ends to the empty stack in response to a signal from proximity sensor 76A or B indicating that an empty stack is properly positioned to receive can ends. FIGS. 6, 7, 8 and 9 deal with the dispensing unit. The dispenser unit, which employs a mounting base plate 200, is fastened to the support plate 64 by means of four mounting bolts. The unit extends through the support plate so that the lower end of feed tube 202 is in close proximity to the top of the receiving stack.

Figure 7:
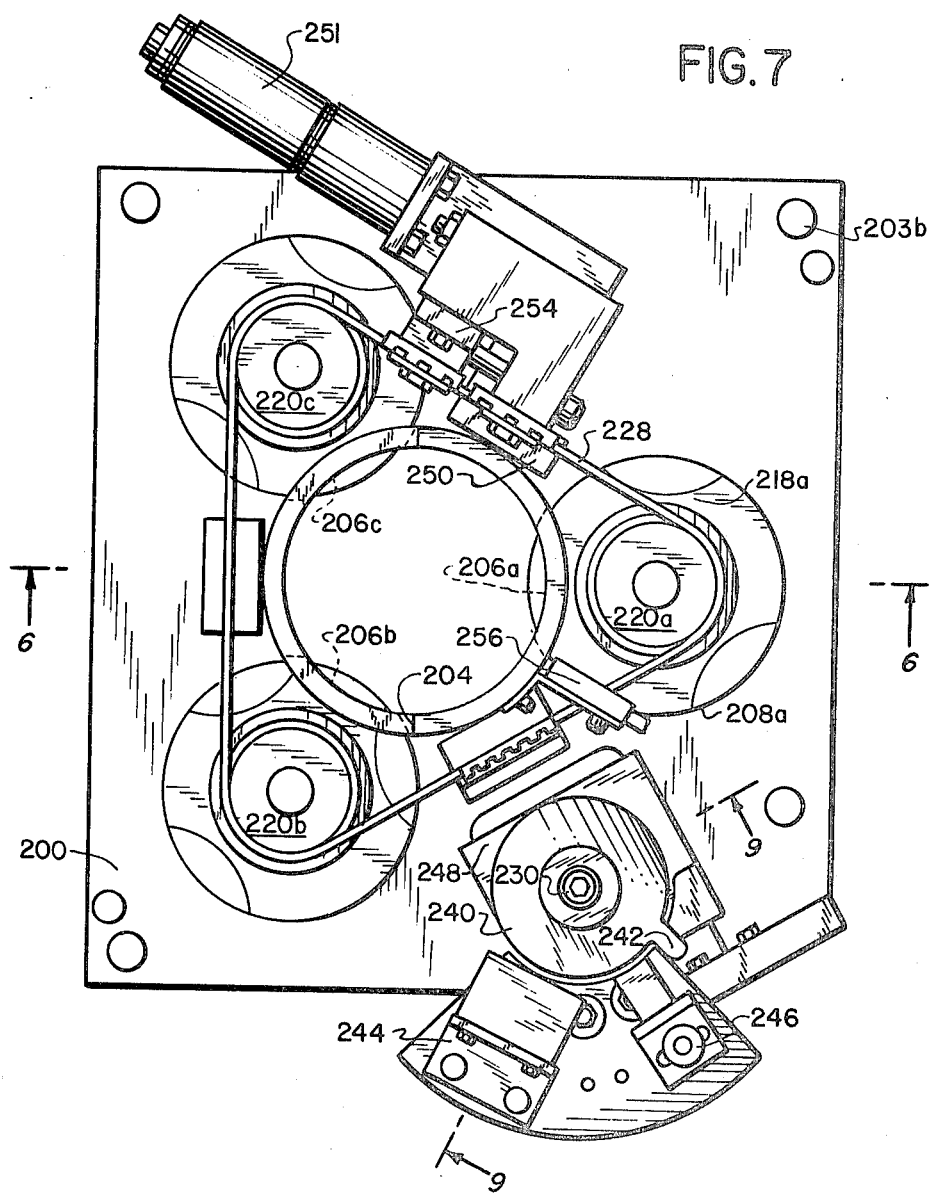
FIG. 7 is a plan view of the dispenser with the drive motor removed.
Figure 8:
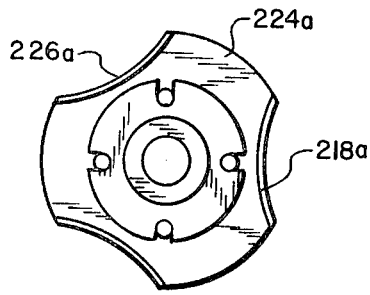
FIG. 8 is a plan view of a stop knife showing three blade portions and three scallop portions.
Figure 9:
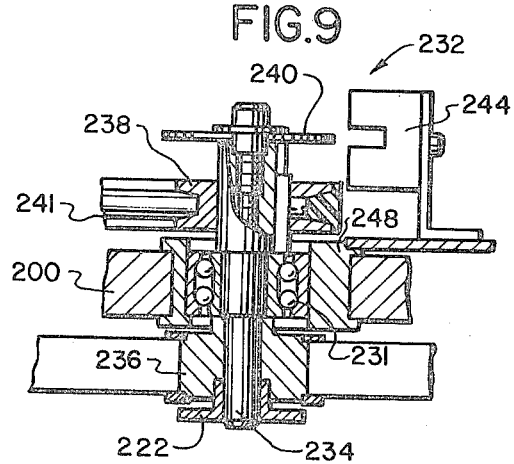
FIG. 9 is a vertical view of the timing assembly taken along the line 9—9 of FIG. 7.

The modular construction facilitates the removal and replacement of the dispenser unit for maintenance purposes or for conversion for handling other end diameters. The vertical feed tube 202 which has a bore slightly larger than the diameter of the can end, is notched at the input end to form a mouth or entrance 204 for acceptance of can ends from the conveyor. Three annular, coplanar slots 206a, b and c in the tube wall are provided for access to the can ends. Three feed rolls, equipped with spiral lands, intrude into the bore of the tube through the annular slots to accept and advance individual ends one at a time. A stop knife independently rotatable is coaxially mounted above each feed roll to intercept and block entry of ends to the feed roll in response to a control signal. A detailed discussion of the end feed and stop mechanism 208a associated with slot 206a will follow. Similar structures are associated with the corresponding mechanisms 208b and c. The feed roll 214a is mounted on upper end of feed roll shaft 210a while a drive pulley 212a is mounted on the lower end of the shaft. The rotary stop knife 218a is coaxially mounted directly above the feed roll. A gear belt pulley 220a mounted on a pilot, is connected to the stop knife to rotationally advance the knife blade into the bore of the feed tube or to retract the knife blade from the tube bore. In the advanced state, the blade portion 224a intercepts and blocks the advance of can ends. In the retracted state, the concave or scalloped portion 226a, of the knife mates with the annular slot and provides the clearance necessary to ensure engagement of the end by the feed roll. In operation, only one of the three blades and scallops for a single knife is used. The blade oscillates back and forth from an advanced to a retracted state. When the blade becomes dull, it may be repositioned on the pulley so that a fresh and sharp knife blade is available. A feed stop gear belt 228 connects with and drives the three feed stop gear belt pulleys in unison. The belt is advanced or retracted 178" by the action of a belt clamp 250 in response to the movement of solenoid 252 which is mounted to the dispenser mounting base by a bracket 254 as shown in FIG. 7. Rotation of the feed roll 214 is effected by a feed roll gear belt 230, which connects the three drive pulleys 212a, b and c with a timing pulley 236. FIG. 9 shows the timing assembly 232 in elevation. A ball bearing 231 which is mounted on slide block 248 is slidably mounted on base 200 to adjust the tension of the belt and receives the timing shaft 234. The timing pulley 236 is mounted on the lower end of the timing shaft 234 with the aid of a clamp ring 222. A drive pulley 238 is keyed to an upper portion of the shaft 234 and is connected by means of a V belt 241 to a 1/6 horsepower gear motor 239 (FIG. 2). A timing disc 240 with a tab 242 is bolted to the end of the timing shaft. The timing means further comprises a proximity sensor 244 and a timing switch 246. Proximity sensor 244 senses each rotation of timing disc 240, as tab 242 passes through the slot in sensor. The count is electronically recorded and stored for comparison with a preset total. When the preset count is reached, a pulse is generated by timing switch 246, which activates solenoid 251, thereby advancing the feed stop knives to intercept the can ends. Coincident with the activation of the feed knives, the feed rolls are stopped from rotation.

Three fiber optic scanners are mounted on the feed tube to assist in operational control of the dispenser. Since rotation of feed rolls 214a, b and c in the absence of a supply of can ends would falsely indicate the delivery of an end, it is essential that a minimum level of ends be maintained within the feed tube. A fiber optic scanner detects the presence of ends at the minimum level, when the level falls below the scanning range of 252, the rotation of the feed rolls is stopped. Fiber optic scanner 254 indicates an accumulation level sufficient to initiate start-up. Fiber optic scanner 256 is a high level sensor, when the accumulated can ends activate scanner 256 a signal is emitted to stop the infeed from conveyor 31.

The bagging unit 46 includes the magazine 48 for storage of a supply of flattened empty bags, a bagging table 50, a bin 54 for the storage of filled bags and a bagger drive unit 68.

The drive unit 68 includes a ¼ horsepower gear motor, 278 which cooperates with a clutch brake 279 to drive a cam shaft 276, on which are mounted three rotatable cams 274, 290 and 300. The operation of the clutch brake is controlled by a cam switch 280. Can 274 controls the operation of bagging table 50. Cam 290 controls operation of vacuum bag pick-up 292 and cam 300 advances or retracts bagging horn 300 into or out of the opened bag.

Figure 17:
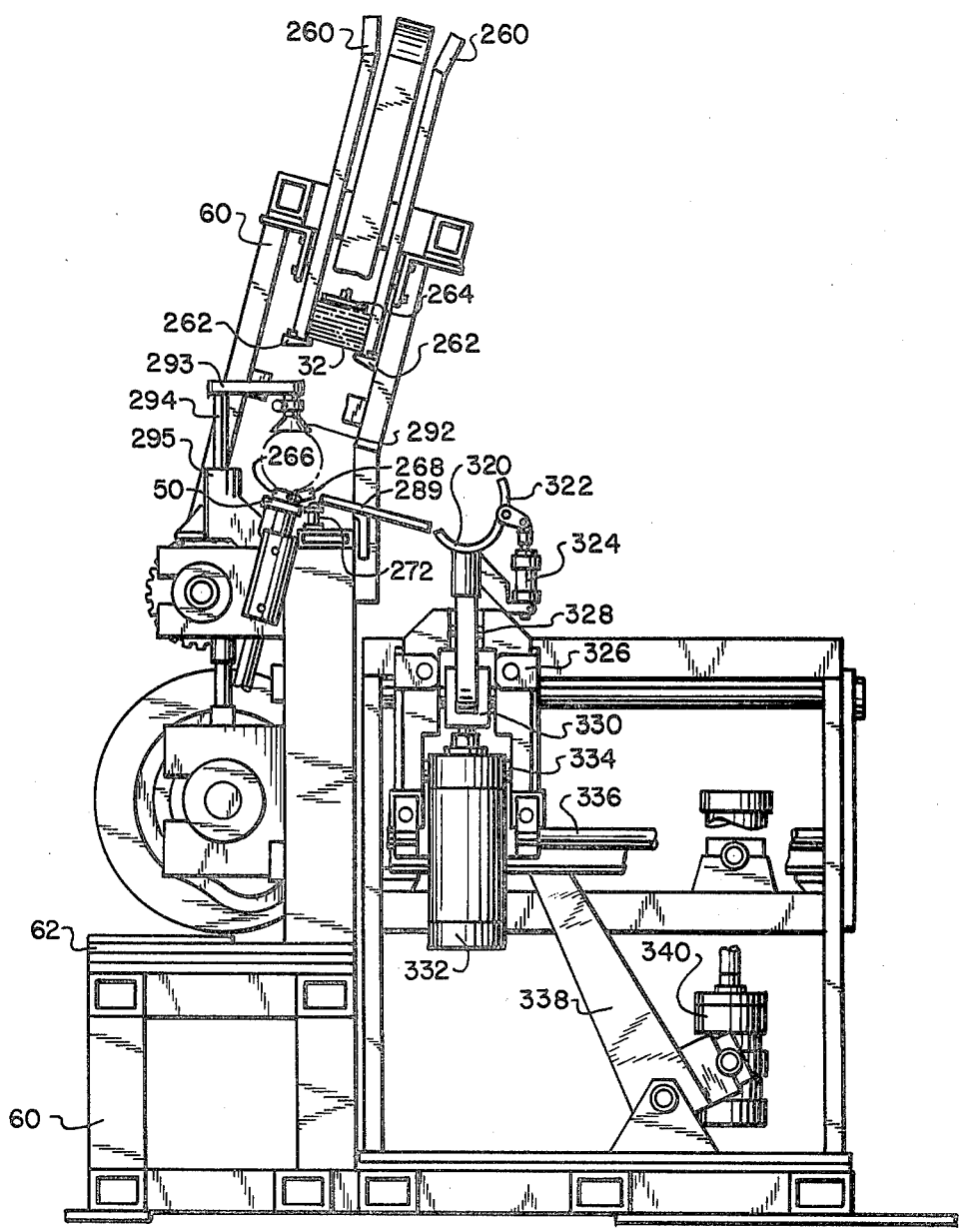
FIG. 17 is a fragmentary right side elevation of the bagging unit taken in section along the line 17—17 of FIG. 2. Included in this view is the bagging cradle and clamping mechanism for removal and storage of the filled bags.

The magazine 48 employs a series of upright members 260 which serve as guides to align the stack of empty bags, a pair of ledges 262 which support the stack of bags and a pressure plate 264 to compress and flatten the bags. The magazine is mounted on frame 60 of the counter bagger above the plane on which the count of ends are discharged from the horizontal end stack. As shown in FIG. 17, the magazine is tilted to the rear at an angle of 15° off the vertical.

The bagging table 50 has two leaves, a fixed forward leaf 266, and a movable rear leaf 268. The leaves are joined by a hinge 269 so that the included angle between the leaves which is normally 180° may be decreased to less than 180°, say 130°. The leaves are provided with vacuum ports which are connected with a vacuum manifold and a control valve so that the vacuum may be applied or released as required. The bagging table may be elevated from the bagging plane as shown in FIG. 17 to the bagger magazine. In its elevated attitude, the included angle between the leaves is substantially 180° so that when the vacuum is applied, the table will effectively address contact and strip the lower most bag from the magazine. When the table descends, it carries the stripped bag with it to the bagging plane. The rear, or movable leaf 268, engages leaf stop approximate the bagging plane. This stop, which is adjustable, bears against the underside of the leaf and thereby cams or inclines leaf 268 toward leaf 266. The inclination of the leaves, one toward the other, reduce the included angle and initiates the opening of the flattened bag. The rise and fall of the bagging table is caused by a lift cam 274 mounted on cam shaft 276 of the bagger drive 68.

Figure 14:
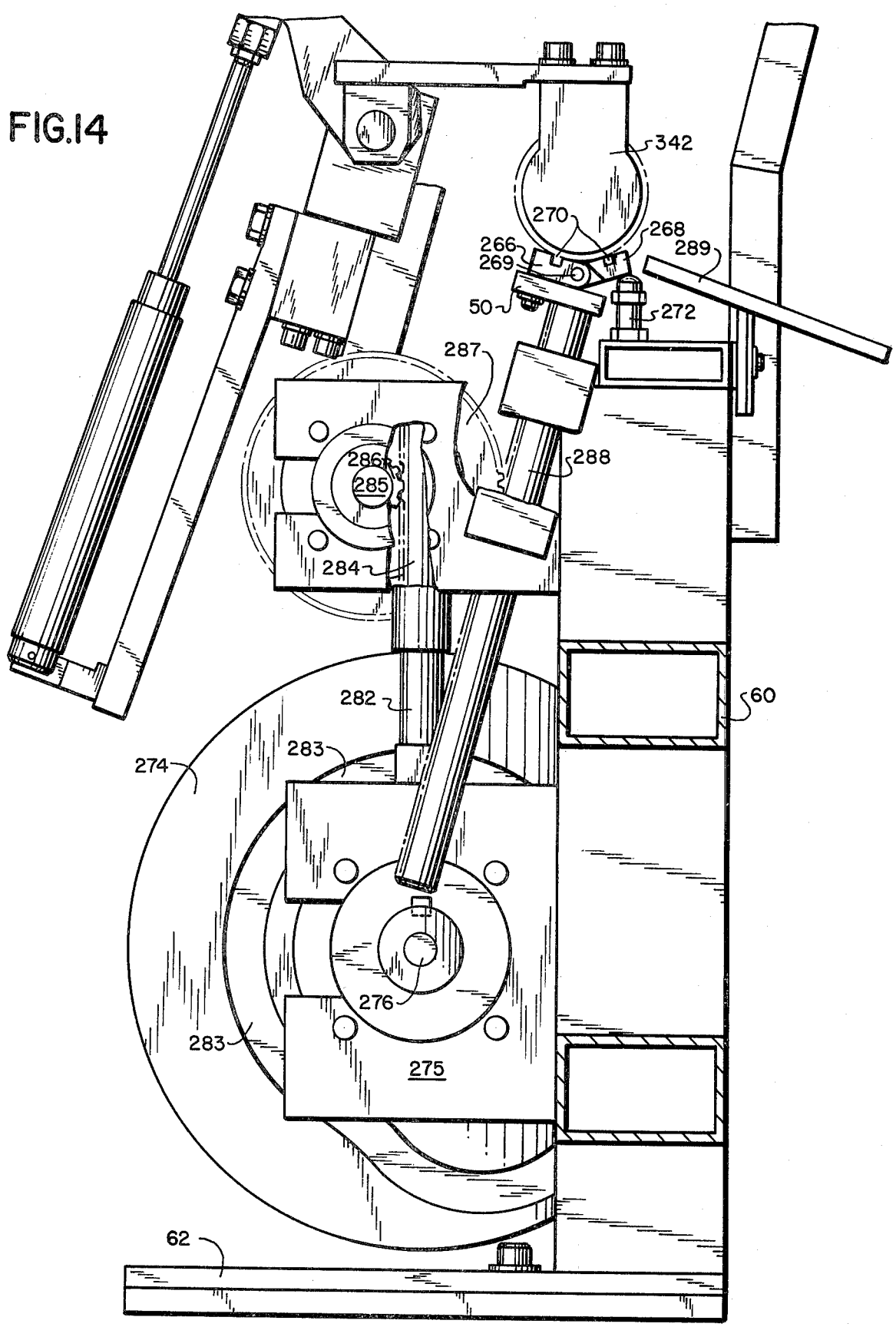
FIG. 14 is a right side elevational view of the lift cam and mechanism for elevating and lowering the bagging table, taken in section along the line 14—14 of FIG. 2.

As best seen in FIG. 14, a lift cam follower 282 engages a cam track 283 in the lift cam 274. A rack 184 on the follower arm engages a pinion 285 which rotates lift shaft 286 and with it the lift gear 287. The lift gear engages lift rack 288, which is affixed to the underside of bagger table 50. Thus the table is elevated at an angle of 15° to address the bagger magazine or lowered to the bagging plane in response to the rotation of the lift cam.

Figure 15:
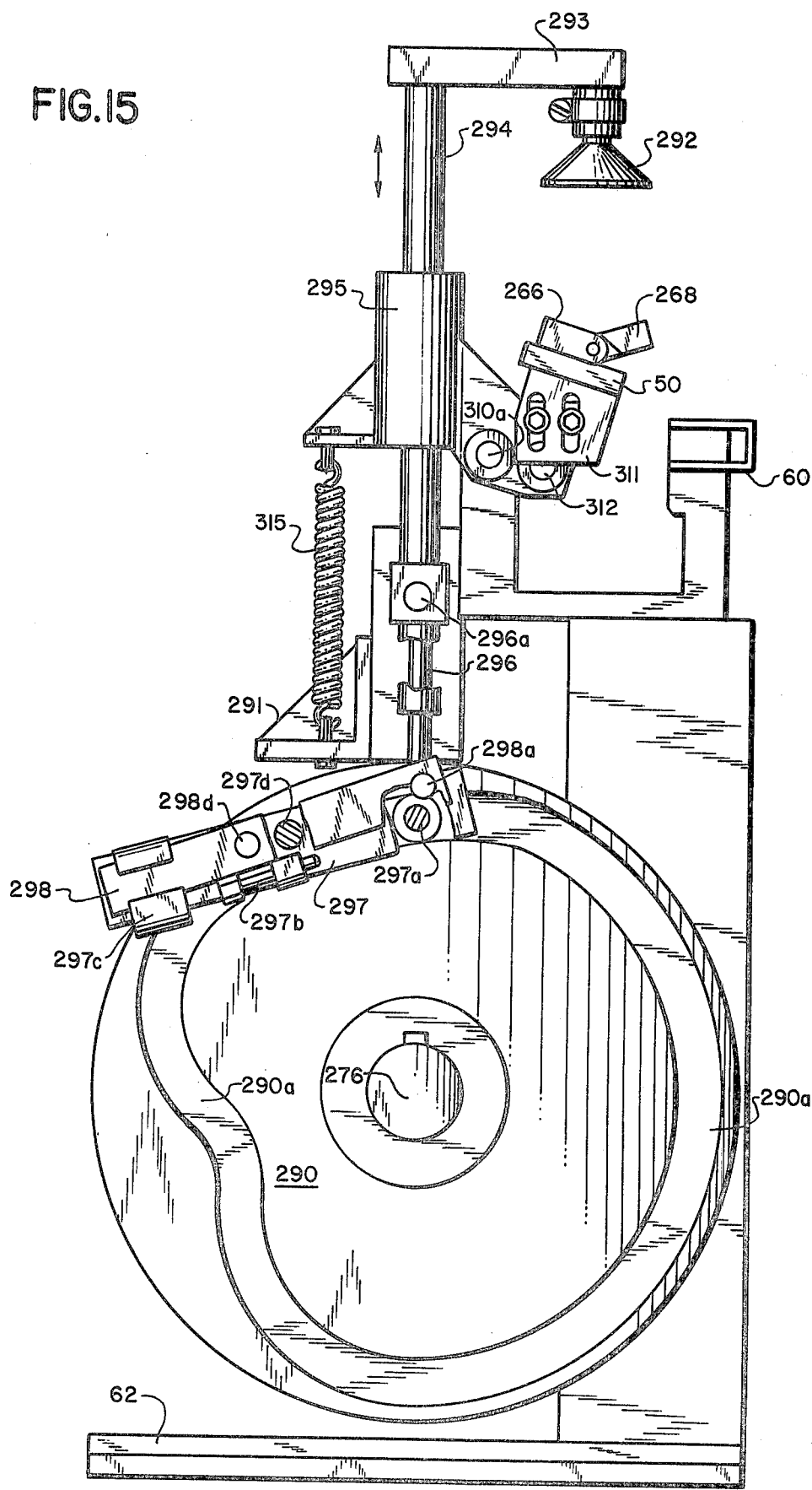
FIG. 15 is a right side elevational view of the bag pick-up cam and mechanism for controlling the movement of the bag pick-up taken in section along the line 15—15 of FIG. 2.
Figure 16:
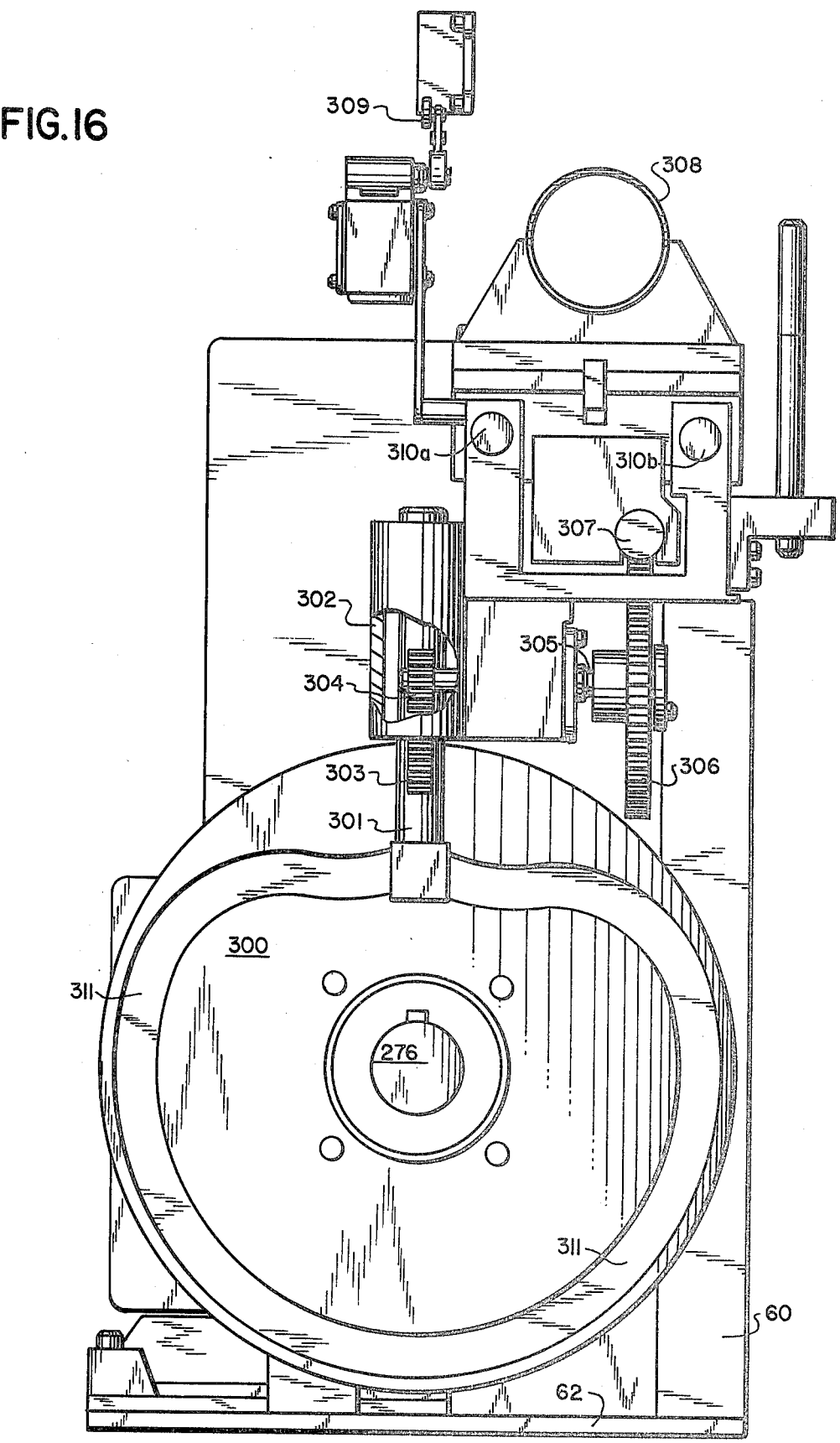
FIG. 16 is a right side elevational view of the horn cam and mechanism for advancing and retracting the bagging horn, taken in section along the line 16—16 of FIG. 2.

A vacuum bag pick-up 292 (FIG. 15) cooperates with the bagger table to open the end of the flattened bag. When the movable leaf 268 of the bagging table is cammed upward by the leaf stop 272, to reduce the included angle between the table leaves and thereby initiate the opening of the flattened bag, the bag pick-up descends to assist in the opening. Pick-up head 292 contacts the upper side of the flattened bag and with aid of a vacuum grasps the upper bag surface and elevates it sufficiently to effect a complete opening of the bag.

The pick-up head 292 is affixed to mounting bar 293 which in turn is joined to the end of slide shaft 294. The slide shaft is slidingly received in mounting bracket 295, thereby permitting the head to rise and fall in response to the movement of the cam follower 297a which rides in cam track of pick-up cam 290.

Since bagger table 50 must be free to ascend and strip a fresh bag from the magazine at the start of each cycle, provision must be made to remove the bag pick-up head and mounting bar from the path of the ascending table. This removal is accomplished by swinging the mounting bracket 295 complete with the slide shaft 294, the mounting bar 293 and the pick-up head 292 about guide rod 310a, which serves as a pivot shaft. This swinging is accomplished by providing a cam block 311 on the underside of the lift table 50, and a cam follower 312 on the rear side of bracket 295. The front of the bracket is biased downwardly by means of a spring 315, so that follower 312 rides against cam block 311. Thus as table 50 rises at an inclination of 15° to the rear to address the bag magazine, the mounting bracket and bag pick-up are swung forward out of the path of ascending table.

The rotational movement of the pick-up cam 290 is translated into vertical reciprocal movement of slide bar 294 by a pair of rocker arms 297 and 298. Primary rocker arm 297 is pivotably mounted to main frame 60 by stud 297b. Secondly, rocker arm 298 is pivotably connected to main frame 60 by pin 298b. The motion of cam follower 297a is transmitted to slide bar 297c. Adjusting turn buckle 297d is used to vary the ratio relationship between 297a-297b to 297b-297c. Slide bar 297c transmits its motion to drive pivot 218a through pivot bar 298. The ratio difference between 297a-297b to 297c and 297c-298b to 218a create a stroke amplification. The adjustable position of 297c on pivot bars 297 and 298 create a variable stroke on pick up head 292. Drive pivot pin 218a is connected to pick up rod 294 by turn buckle 296 and pivot point 296a. Turn buckle 296 is used to vary the distance between pick up head 292 and the bagging table 50.

A horn cam 300 mounted on cam shaft 276 cause follower rod 301 supported in slide bearing 302 to rise and fall. A rack 303 cut in rod 301 engages a pinion 304 which rotates horn shaft 305 and with it horn gear 306 which engages horn rack 307 thereby moving horn 308 into or out of an opened bag. A pair of limit switches 309a and b monitor the entry and exit of the end stack elevator pedestal into and out of the horn. A pair of bagging horn slide rods 310a and b, guide the horn in its movement into and out of the bag.

Figure 18:
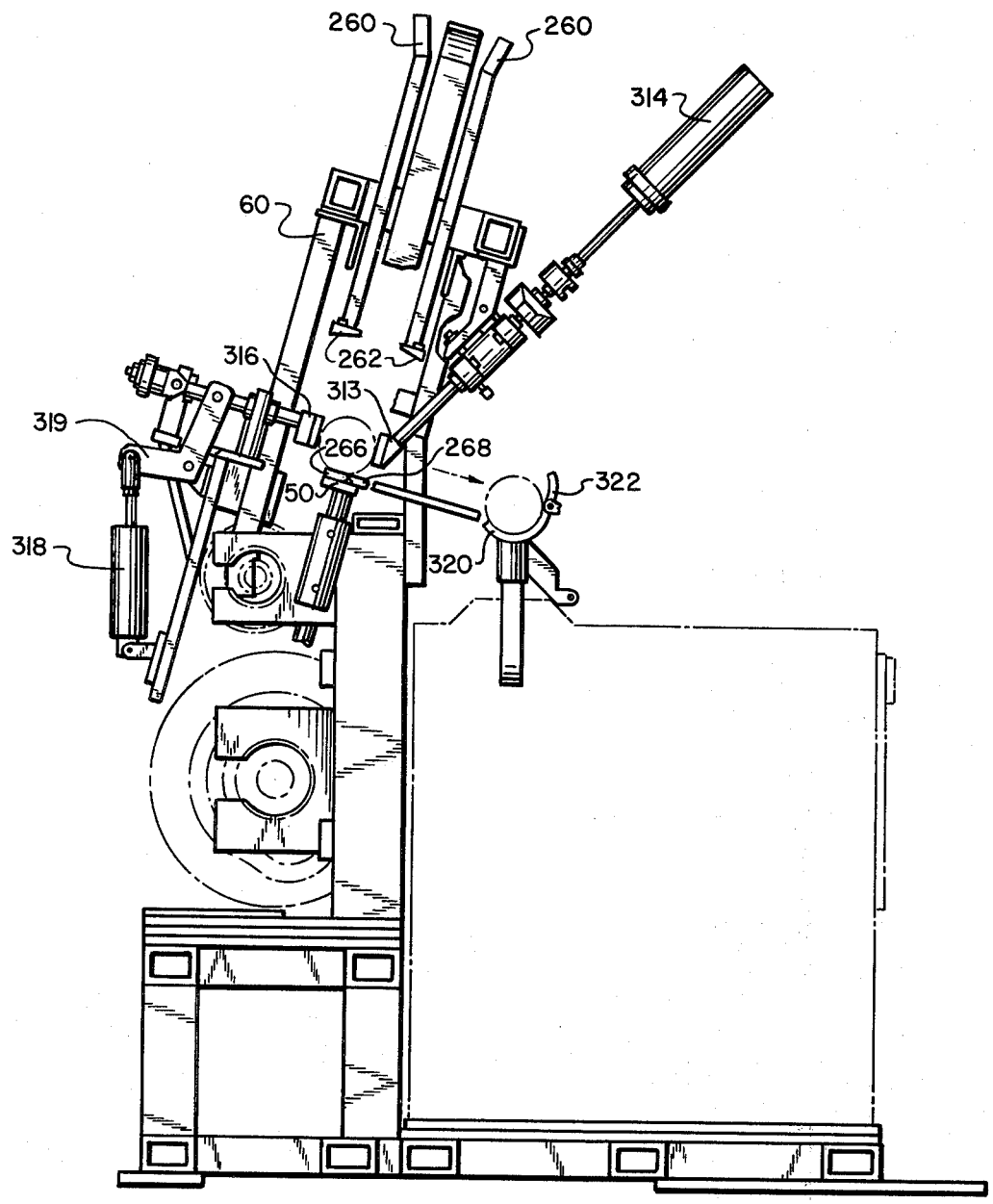
FIG. 18 is a fragmentary right side elevation of the bagging unit showing pneumatically operated filled bag handling features of control and discharge of the filled bag from the bagging table.

The filled bag of can ends is discharged from the bagging table to the transfer slide plate 290 as the bagging table rises. FIG. 18 shows the use of a pair of friction bars to assist in the control and discharge of the filled bag. When the bagging table 50 has been elevated sufficiently to bring the movable leaf 268, the fixed leaf 266 and the transfer plate 290 into a common inclined plane, the rear friction bar 312 is elevated by air cylinder 314 thereby releasing the bag. Forward friction bar 316 may then be advanced by the action of air cylinder 318 on bell crank 320. The bag of ends is deposited into bag cradle 320 where it is clamped in place by bag clamp 322 by the action of air cylinder 324 (FIG. 17). The cradle is pivotably mounted on carriage 326 by means of pivot pin 328. A clevis 330 pivotably connects the cradle mounting plate to an air cylinder 332. The air cylinder 332 is also pivotably mounted to the carriage by mounting pins 334. Activation of air cylinder 332 causes cradle 320 to tilt from the horizontal plane to a substantially vertical plane for the release of the filled bag to the storage rack. The carriage may be transferred along a pair of slide rods 336 from the forward storage bag as shown in FIG. 18 to the rear storage bag by means of a crank 338 and an air cylinder 340.

In operation, the elevator pedestals 94 of both stack 40A and B are jogged to within 1" of the top of the stack, and any ends within the stack are removed. When an empty stack is properly positioned under the dispenser, proximity sensor 76A or B will close a cam switch and turn on an indicating light. The cam 276 shaft is jogged to a start position. Gear motor 239 which drives feed rolls 214a, b and c may now be started. The transmission drive motor 44 is started. The cam shaft drive brake 279 will release, the clutch will engage and the drive motor 278 will cause cam shaft 276 to make 1 complete revolution returning to the zero or start position. The cam shaft rotation will cause the following actions to occur:

The bagging horn 308 will retreat from the bag;
The bag pick-up 292 will release the bag and elevate out of the way;
The bagging table 50 will rise to permit the friction bars 312 and 316 to move the bag to the bag cradle 320 for release to storage;
The bagging table 50 will continue to rise, strip a bag from the magazine 48 and return to the bagging plane where the table leaves will be inclined toward each other to reduce the included angle from 180° to less than 180°, say 135°, thereby initiating the opening of the empty bag.

The vacuum bag pick-up 292 which is operated by the pick-up cam 290, descends to engage the upper surface of the tabled bag proximate the mouth of the bag, and assists in completing the opening of the bag. The cooperative action of the upper and lower suction means to effect opening of the bag, permit the use of recycled bags, thereby avoiding the necessity of employing new bags for each trip. Further, the instant opening means allows the flattened bags to be stacked randomly in the magazine with the flap of the bag mouth either up or down. After the bag has been completely opened, horn cam 300 will advance the horn 308 into the mouth of the bag to facilitate the entry of the ends.

Can ends 30 are fed into feed tube 202 of dispenser 38 by conveyor 31. The ends which enter the tube mouth 204 are prevented from passing through the tube into the stack disposed below by three knife blades 224a, b and c, which intrude into the base of the tube through three annular slots 206a, b and c. A supply of ends is threfore built-up within the feed tube until the level of collected ends reaches and activates fiber optic scanner 254. The activation of scanner 254 in turn actuates proximity timing switch 246 which energizes solenoid 251, thereby retracting belt clamp 250 and feed belt 228 gripped thereby. Retraction of feed belt 228 imparts a counterclockwise rotational movement to the three feed stop pulleys 220a, b and c which in turn cause rotational displacement of the three feed stop knives 218a, b and c, so that the three blade portions 224a, b and c are replaced by three corresponding scallop portions 226a, b and c. Since the blade portions are no longer received within the tube bore, the ends are free to engage the feed rolls 214a, b and c. Rotation of the feed rolls is initiated simultaneously with the retreat of the three knife blades. The spiral land of the feed rolls engage and advance the ends singly into the end stack 40A or 40B. With each rotation of the feed rolls, there is a corresponding rotation of timing disc 240. As the tab 242 of the timing disc passes through proximity sensor 244, a count is tallied and stored for comparison with a preset count. If the level of accumulated ends in the feed tube rises due to an interruption in the bagging or stacking of ends, sensor 256 will detect the rise and stop conveyor 31, thereby avoiding a jam up at the mouth of the feed tube. If the level of accumulated ends in the feed tube falls due, for example to a conveyor stoppage, the low level sensor 252 will activate the feed stop knives and stop the feed rolls to avoid a miscount of ends which would occur with an empty feed tube. The elevator pedestal 94 of the end stack is lowered by a variable speed D.C. motor. The elevator retreats in time with the feed rate to maintain the top of the stacked ends close to the discharge of the dispenser feed tube. In this way, the free fall distance of the ends is minimized and close control is ensured.

When the preset count is matched by the tally of ends delivered, the timing switch 246 de-energizes solenoid 251 which in turn causes the feed stop knife blades 224a, b and c to intrude into feed tube 202 to intercept the can ends and prevent their advance. At the same time, the rotation of the feed rolls is stopped, and the D.C. drive lowering the elevator pedestal of the end stack is stopped. The indexing drive brake is released, the drive clutch is engaged and the end stacks are indexed to carry the loaded stack from the first position to the second position and the empty stack from the second position to the first position. During indexing, a sample end is released for pick-up by the sample tube. The proximity counter is not activated during sampling. The timing switch is turned on for 1 revolution. When the indexing is complete, position sensor 76 is activated. At this point, the rear stack is locked in vertical alignment with the feed tube of the dispenser unit thereby preventing further rotation of the stacks. The transmission, however, is still engaged and accordingly motion is transmitted through differential 169 to the forward stack located in the second position which is not pivotably constrained. Accordingly, the forward stack is pivoted from its normally vertical attitude to a horizontal attitude which places it in the bagging plane aligned with the open bag on the bagging table 50. When the forward stack reaches the horizontal attitude, a cam switch disengages the drive clutch and engages the drive brake, thereby preventing further pivotal movement. At the same time, the D.C. drive of the horizontal stack is activated and the elevator pedestal advances to unload the arrayed ends through the horn into the open bag. The elevator continues to advance until the pedestal is disposed within the bagging horn, thereby advancing the full count of ends into the bag. At this point, a first limit switch, 309, is tripped. This limit switch stops the D.C. drive motor of the elevator, reverses its direction and retracts the pedestal until a second limit switch, (not shown), is tripped. This indicates that the pedestal has been withdrawn from within the horn. At this point, the D.C. drive motor of the horizontal stack is stopped. The second limit switch additionally releases the drive brake, and engages the drive clutch to return the forward stack from a horizontal attitude to a vertical attitude, where it will remain until the stack in the first or loading position is fully loaded and is ready for reindexing.

While the instant apparatus has been described in terms of twin stacks, it should be appreciated that the apparatus could operate effectively with a single stack. In such a case, the indexing operation would be eliminated but the stack would still be free to pivot from a vertical attitude for loading to a horizontal attitude for unloading.

Finally, it should further be appreciated, that the apparatus might be constructed with more than two stacks. For example, it would be possible to replace each of the stacks in the instant structure with two duplicate stacks so that while two stacks are loaded, two stacks could be unloaded. Such a design might be employed where one desired to keep separate the ends produced on two different presses due to distinctions in size or configuration.

Thus it can be seen that the instant affords a means for counting and bagging where the ends are moved and handled collectively in stacks rather than as discrete ends, so that damage to the ends is substantially minimized. It can even be further seen that the apparatus is simple, compact and may be expected to be economical to manufacture, operate and control.

What is claimed is:

1. Apparatus for counting and bagging can ends comprising:
   (a) a frame;
   (b) dispensing means, mounted on said frame for receiving, orienting and dispensing a count of can ends;
   (c) turret means, mounted on said frame for rotation about a vertical axis, said turret being indexable from a first position to a second position, or from a second position to a first position, said turret means further including pivot means operable in said second position;
   (d) a first stack and a second stack, pivotably mounted below said dispensing means on opposite sides of said turret in vertical parallel spaced apart relation, and wherein said first stack is aligned with said dispensing means for receiving accumulating and axially arraying said count of can ends and wherein said turret may be indexed to rotate and first stack from said first position to a second position remote therefrom and concurrently therewith to rotate said second stack from said second position to said first position for receipt of a count of can ends and wherein said stack in said position may then be pivoted from a vertical attitude to a horizontal attitude for unloading said count of ends or from a horizontal attitude to a vertical attitude for indexing of said turret; and
   (e) bagging means mounted on said frame to receive a bag and support said bag in alignment with said horizontally disposed stack.

2. The apparatus of claim 1 wherein said stack comprises:
   (a) a mast with a bearing plate for pivotal mounting on said turret;
   (b) guide blocks mounted on said mast in longitudinal alignment;
   (c) a slide rail received within said guide blocks to support said stacked can ends when said stack is in said horizontal attitude and when said ends are conveyed along said rail during said unloading;
   (d) a plurality of guide rods received within said guide blocks defining in cooperation with said rail a channel in which said ends are arrayed;
   (e) an elevator movable within said channel to support said arrayed ends when said stack is in said vertical attitude and to expell said arrayed ends during unloading; and
   (f) drive means to advance and retract said elevator.

3. The apparatus of claim 2 wherein the speed of the drive means may be controlled to synchronize the lowering of said elevator with the feed rate of said dispensing means to ensure a uniform and minimum free fall distance for said can ends.

* * * * *